(12) United States Patent
Narita et al.

(10) Patent No.: US 10,158,108 B2
(45) Date of Patent: Dec. 18, 2018

(54) POWER STORAGE DEVICE INCLUDING SEPARATOR SURROUNDING ELECTRODE

(71) Applicant: SEMICONDUCTOR ENERGY LABORATORY CO., LTD., Atsugi-shi, Kanagawa-ken (JP)

(72) Inventors: Kazuhei Narita, Kanagawa (JP); Jun Ishikawa, Kanagawa (JP); Teppei Oguni, Kanagawa (JP); Aya Uchida, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 212 days.

(21) Appl. No.: 14/919,136

(22) Filed: Oct. 21, 2015

(65) Prior Publication Data

US 2016/0118637 A1    Apr. 28, 2016

(30) Foreign Application Priority Data

Oct. 24, 2014   (JP) .................................. 2014-216849

(51) Int. Cl.
*H01M 2/16* (2006.01)
*H01M 2/18* (2006.01)
(Continued)

(52) U.S. Cl.
CPC .......... *H01M 2/1673* (2013.01); *H01G 11/28* (2013.01); *H01G 11/52* (2013.01);
(Continued)

(58) Field of Classification Search
CPC .... H01M 2/1673; H01M 2/18; H01M 2/1626; H01M 10/0525; H01M 10/0566; H01G 11/28; H01G 11/52
(Continued)

(56) References Cited

U.S. PATENT DOCUMENTS 7,297,289 B2    11/2007    Sato et al.
8,088,917 B2    1/2012    Forsyth et al.
(Continued)

FOREIGN PATENT DOCUMENTS

JP    2000315489 A  *  11/2000
JP    2001076761 A  *  3/2001
(Continued)

OTHER PUBLICATIONS

Kojima, Akira, Machine Translation of JP 2000-315489 A, Nov. 2000 (Year: 2000).*
(Continued)

*Primary Examiner* — Sean P Cullen
(74) *Attorney, Agent, or Firm* — Nixon Peabody LLP; Jeffrey L. Costellia

(57) ABSTRACT

When cellulose is used as a separator, the cellulose is impregnated with an ionic liquid. Charge and discharge are repeated with this separator touching a surface of a current collector; then, the separator is changed in color. Thus, it is an object to provide a power storage device with a structure in which a side reaction other than a battery reaction, e.g., a change in color of separator, is unlikely to occur. In the power storage device, a separator impregnated with an ionic liquid is not in contact with a surface of a current collector. The separator has a tubular shape, a bag-like shape, or a sheet-like shape. The separator includes cellulose. The power storage device including the ionic liquid is non-volatile and non-flammable. The power storage device can be bent.

16 Claims, 11 Drawing Sheets

(51) Int. Cl.
| | |
|---|---|
| *H01M 10/0566* | (2010.01) |
| *H01G 11/28* | (2013.01) |
| *H01G 11/52* | (2013.01) |
| *H01G 11/58* | (2013.01) |
| *H01M 10/0525* | (2010.01) |
| *H01G 11/50* | (2013.01) |

(52) U.S. Cl.
CPC ............ *H01M 2/1626* (2013.01); *H01M 2/18* (2013.01); *H01M 10/0525* (2013.01); *H01M 10/0566* (2013.01); *H01G 11/50* (2013.01); *Y02E 60/13* (2013.01); *Y02T 10/7011* (2013.01); *Y02T 10/7022* (2013.01)

(58) Field of Classification Search
USPC .......................... 429/131, 136, 140; 361/502
See application file for complete search history.

(56) References Cited

U.S. PATENT DOCUMENTS

| | | | |
|---|---|---|---|
| 8,795,544 B2 | 8/2014 | Ito et al. | |
| 8,951,664 B2 | 2/2015 | Ito et al. | |
| 2003/0099885 A1* | 5/2003 | Kim ........................ | H01M 4/13 429/241 |
| 2005/0106440 A1 | 5/2005 | Komiya | |
| 2007/0099079 A1 | 5/2007 | Matsumoto et al. | |
| 2007/0099090 A1 | 5/2007 | Oh et al. | |
| 2008/0296531 A1 | 12/2008 | Whiston et al. | |
| 2009/0197175 A1* | 8/2009 | Nagai ..................... | H01G 9/016 429/231.1 |
| 2010/0209784 A1 | 8/2010 | Yamazaki et al. | |
| 2010/0216027 A1* | 8/2010 | Fujii ..................... | H01G 9/016 429/246 |
| 2010/0227228 A1 | 9/2010 | Yamazaki et al. | |
| 2011/0020706 A1 | 1/2011 | Nesper | |
| 2011/0070486 A1 | 3/2011 | Matsumoto et al. | |
| 2011/0081583 A1* | 4/2011 | Sugimoto ............. | H01M 2/145 429/346 |
| 2011/0294005 A1 | 12/2011 | Kuriki et al. | |
| 2012/0021279 A1 | 1/2012 | Le Bideau et al. | |
| 2012/0045692 A1 | 2/2012 | Takemura et al. | |
| 2012/0088151 A1 | 4/2012 | Yamazaki et al. | |
| 2012/0088156 A1 | 4/2012 | Nomoto et al. | |
| 2012/0328960 A1 | 12/2012 | Ito et al. | |
| 2013/0164609 A1 | 6/2013 | Ito et al. | |
| 2013/0164610 A1 | 6/2013 | Itakura et al. | |
| 2014/0050957 A1* | 2/2014 | Yang .................. | H01M 10/0459 429/94 |
| 2015/0180000 A1* | 6/2015 | Roumi ................ | H01M 2/1673 429/50 |

FOREIGN PATENT DOCUMENTS

| | | |
|---|---|---|
| JP | 2003-331918 A | 11/2003 |
| JP | 2005100899 A * | 4/2005 |
| WO | WO-2009/003224 | 1/2009 |

OTHER PUBLICATIONS

Tanaka, Takehiko, Machine Translation of JP 2005-100899 A, Apr. 2005 (Year: 2005).*

Sakaebe.H et al., "N-Methyl-N-propylpiperidinium bis(trifluoromethanesulfonyl)imide (PP13-TFSI)—novel electrolyte base for Li battery", Electrochemistry Communications, Jul. 1, 2003, vol. 5, No. 7, pp. 594-598.

Matsumoto.H et al., "Fast cycling of Li/LiCoO2 cell with low-viscosity ionic liquids based on bis(fluorosulfonyl)imide [FSI]", Journal of Power Sources, Mar. 22, 2006, vol. 160, No. 2, pp. 1308-1313.

Macfarlane.D et al., "Pyrrolidinium Imides: A New Family of Molten Salts and Conductive Plastic Crystal Phases", J. Phys. Chem. B (Journal of Physical Chemistry B), Feb. 2, 1999, vol. 103, No. 20, pp. 4164-4170.

Mizuhata.M et al., "Thermophysical Properties of Binary Aliphatic Quaternary Ammonium Ionic Liquids: TMPAFSAxTFSA1-x", ECS Transactions, 2010, vol. 25, No. 39, pp. 3-12, The Electrochemical Society.

* cited by examiner

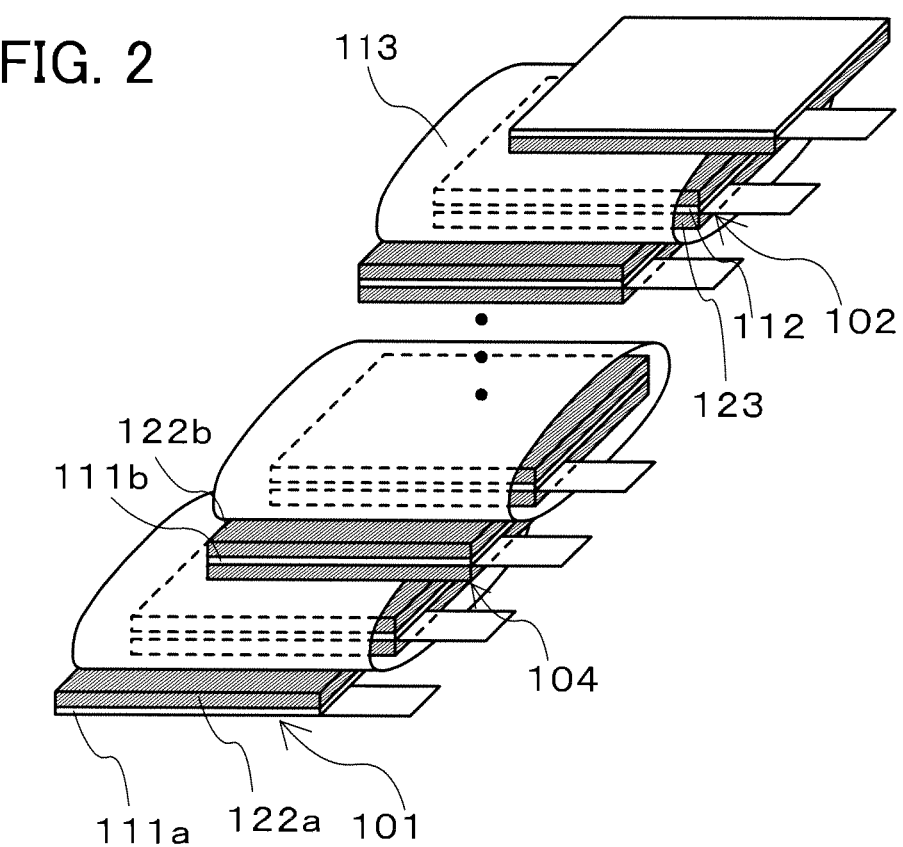

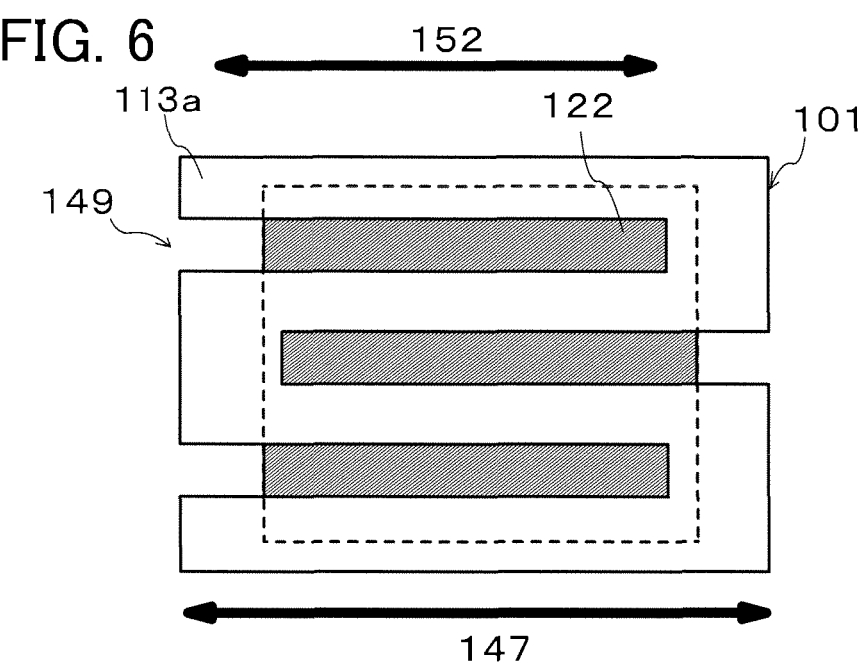

FIG. 11
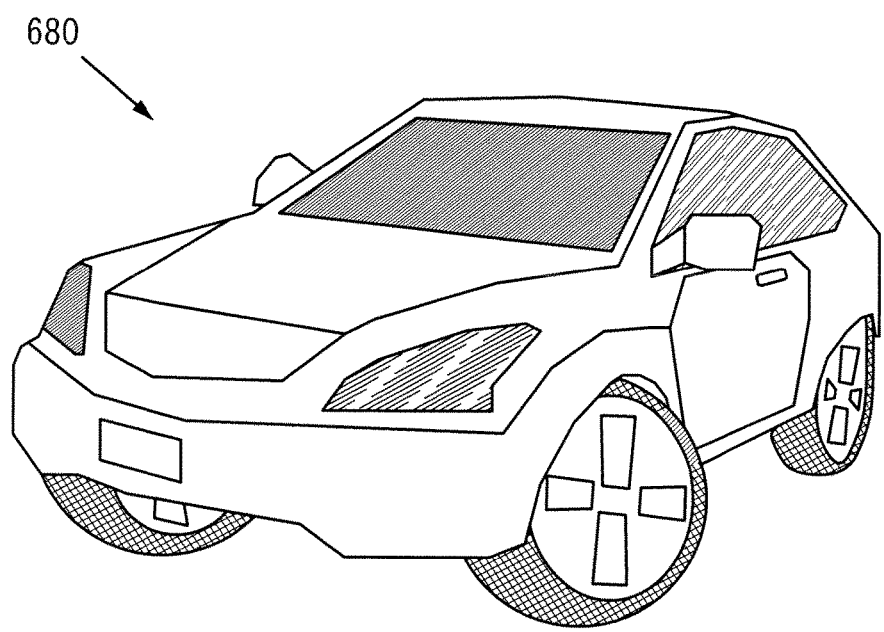
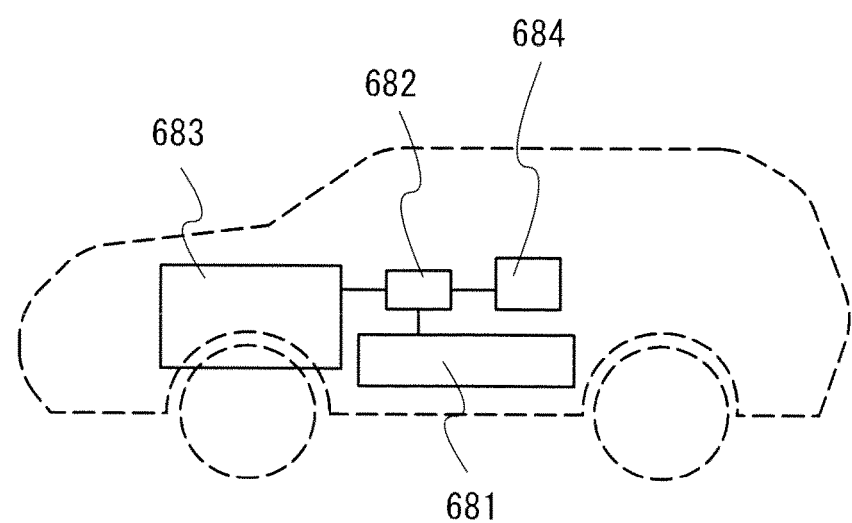

POWER STORAGE DEVICE INCLUDING SEPARATOR SURROUNDING ELECTRODE

BACKGROUND OF THE INVENTION

1. Field of the Invention

One embodiment of the present invention relates to a power storage device. Note that the power storage device refers to all elements and devices that have a function of storing power. Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, an imaging device, a method for driving any of them, and a method for manufacturing any of them.

2. Description of the Related Art

In recent years, a variety of power storage devices, for example, nonaqueous secondary batteries such as lithium-ion batteries (LIBs), lithium-ion capacitors (LICs), and air cells have been actively developed. In particular, demand for lithium-ion secondary batteries with high output and high energy density has rapidly grown with the development of the semiconductor industry, for the uses of electric appliances, for example, portable information terminals such as mobile phones, smartphones, and laptop computers, portable music players, and digital cameras; medical equipment; and next-generation clean energy vehicles such as hybrid electric vehicles (HEVs), electric vehicles (EVs), and plug-in hybrid electric vehicles (PHEVs). The lithium-ion secondary batteries are essential for today's information society as rechargeable energy supply sources.

Widely-used lithium-ion secondary batteries generally use a nonaqueous electrolyte (also referred to as a nonaqueous electrolyte solution or simply an electrolyte solution); the nonaqueous electrolyte contains an organic solvent such as ethylene carbonate, propylene carbonate, fluorinated cyclic ester, fluorinated acyclic ester, fluorinated cyclic ether, or fluorinated acyclic ether, and a lithium salt containing lithium ions. Note that the fluorinated cyclic ester in this specification refers to a cyclic ester in which fluorine is substituted for hydrogen as in a cyclic ester having alkyl fluoride. Similarly, in the fluorinated acyclic ester, the fluorinated cyclic ether, or the fluorinated acyclic ether, fluorine is substituted for hydrogen.

However, the organic solvent has volatility and a low flash point; thus, when the organic solvent is used in a lithium-ion secondary battery, the internal temperature of the lithium-ion secondary battery might increase owing to internal short-circuit, overcharging, or the like, and the lithium-ion secondary battery would explode or catch fire. In addition, some kinds of organic solvent produce a hydrofluoric acid by a hydrolysis reaction. This hydrofluoric acid corrodes metal, which might decrease the reliability of batteries.

In view of the above problems, an ionic liquid which has non-volatility and non-flammability has been used as a nonaqueous solvent for a nonaqueous electrolyte of a lithium-ion secondary battery. Examples of such an ionic liquid are an ionic liquid containing an ethylmethylimidazolium (EMI) cation and an ionic liquid containing an N-methyl-N-propylpiperidinium (PP13) cation (see Patent Document 1).

REFERENCE

Patent Document

[Patent Document 1] Japanese Published Patent Application No. 2003-331918

SUMMARY OF THE INVENTION

An ionic liquid, unlike a polymer solid electrolyte and the like, is a substance with which a separator can be impregnated. Impregnation reduces the thickness of a power storage device. A thin power storage device is easy bent and lightweight.

However, a side reaction other than a battery reaction occurs in some cases. A product of the side reaction might degrade the power storage device.

For example, when cellulose is used as a separator, the cellulose is impregnated with the ionic liquid. Charge and discharge were repeated with this separator touching a surface of a current collector; then, the separator was changed in color.

A reaction product was found in the discolored separator. This is probably due to a side reaction other than a battery reaction that occurs when the separator reacts with the ionic liquid or a positive electrode current collector in the cycle measurement of the power storage device. Another possible reason for the side reaction is a high voltage applied to the positive electrode current collector positioned on the outer side. Such a side reaction probably promoted degradation in cycle performance.

In addition, the side reaction with not only the positive electrode current collector but also a negative electrode current collector could occur, because when a negative electrode is positioned on the outer side, the negative electrode current collector has a surface touching the separator and is applied with a high voltage like the positive electrode current collector.

In view of the above, one embodiment of the present invention provides a power storage device that includes an ionic liquid and a separator and in which a reaction product is less likely to be produced.

One embodiment of the present invention provides a power storage device in which a separator is impregnated with an ionic liquid and a reaction product is less likely to be produced.

One embodiment of the present invention provides a novel power storage device.

One embodiment of the present invention is a power storage device in which a separator is not in contact with a surface of a current collector. The current collector includes a positive electrode current collector and a negative electrode current collector.

In the above structure, the separator can be in contact with an active substance. Therefore, when the active substance is provided on both surfaces of the current collector, the separator can be provided without touching the surfaces of the current collector.

In one embodiment of the present invention, the separator has a tubular shape, is easy to handle, and can prevent a short-circuit between a positive electrode and a negative electrode.

One embodiment of the present invention has a layered structure in which a plurality of negative electrodes and a plurality of positive electrodes are alternately arranged. The tubular separator can surround any electrode other than the outermost electrode. The outermost electrode is not provided with the separator.

One embodiment of the present invention is a power storage device in which an electrolyte is in contact with a separator. When an ionic liquid is used as the electrolyte, the separator is impregnated with the ionic liquid.

One embodiment of the present invention is a power storage device including cellulose as a separator.

In one embodiment of the present invention, the separator can have a variety of shapes as long as it is not in contact with the current collector. For example, the separator can have an opening. The separator with an opening is arranged so as to prevent a short-circuit between the positive electrode and the negative electrode and so as not to be in contact with the current collector.

One embodiment of the present invention is a bendable power storage device. The bendable power storage device is easier to bend when a separator includes an opening. Note that the description of these objects does not disturb the existence of other objects. In one embodiment of the present invention, there is no need to achieve all the objects. Other objects will be apparent from and can be derived from the description of the specification, the drawings, the claims, and the like.

According to one embodiment of the present invention, a reaction product is less likely to occur, preventing degradation of the properties of the power storage device.

According to one embodiment of the present invention, a power storage device using an ionic liquid, which is non-volatile and non-flammable compared with a power storage device using other electrolytes, can be provided.

According to one embodiment of the present invention, a novel power storage device can be provided.

Note that the description of these effects does not disturb the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIG. 2 illustrates a structure of a power storage device of one embodiment;

FIG. 6 illustrates a structure of a separator of one embodiment;

FIG. 11 illustrates an electric appliance.

DETAILED DESCRIPTION OF THE INVENTION

Figure 1A:
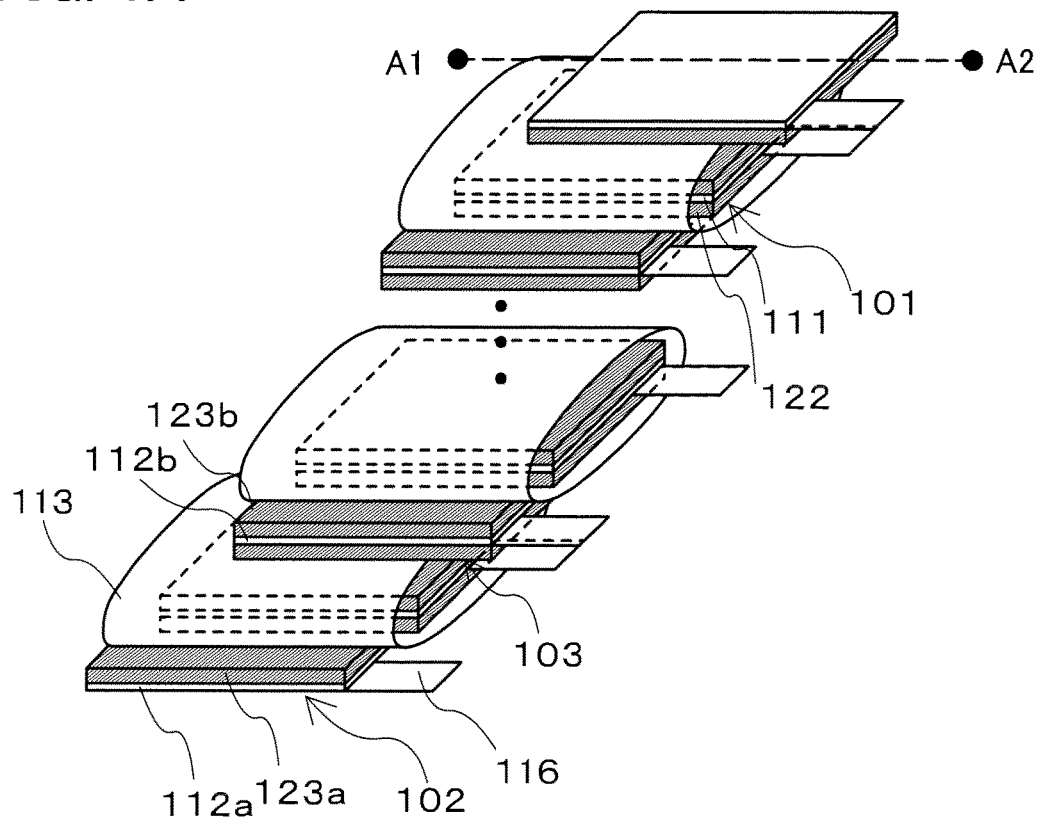
FIGS. 1A and 1B illustrate structures of a power storage device of one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below. Note that in the structures of the invention described below, the same portions or portions having similar functions are denoted by the same reference numerals in different drawings, and description of such portions is not repeated.

Embodiment 1

Described in this embodiment is a structure of a secondary battery including a separator that has a tubular shape surrounding a negative electrode.

A perspective view of FIG. 1A illustrates a plurality of negative electrodes, a plurality of positive electrodes, and the like as electrodes. Reference numeral 101 denotes one of the plurality of negative electrodes. Reference numerals 102 and 103 denote two of the plurality of positive electrodes. The positive electrode 102 is on the outer side of a layered structure and the positive electrode 103 is on the inner side of the layered structure. Each of the electrodes is provided with a tab 116. The tabs of the positive electrodes overlap with each other and the tabs of the negative electrodes overlap with each other.

Figure 1B:
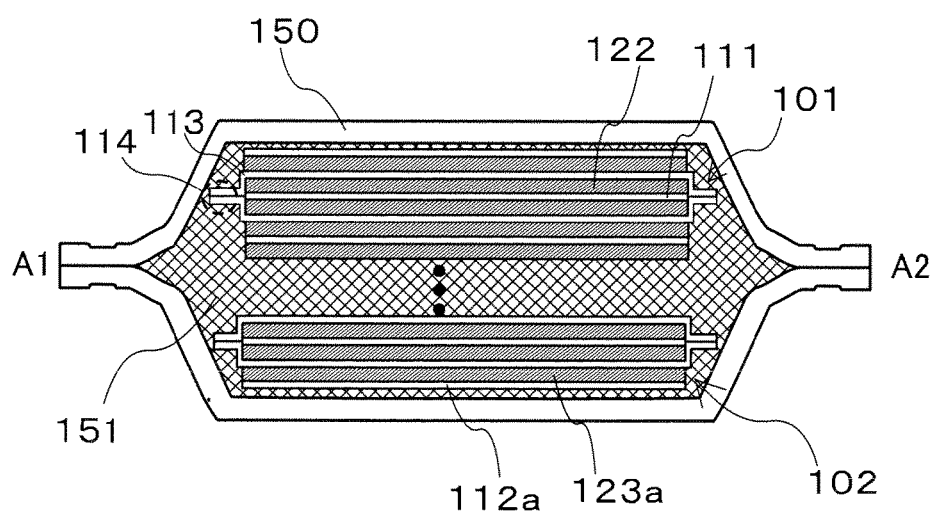

FIG. 1B is a cross-sectional view along line A1-A2 of the layered structure in FIG. 1A.

The positive electrodes face and overlap with the negative electrodes. The overlapping of the positive electrodes and the negative electrodes leads to increased capacity.

The negative electrode 101 includes a negative electrode current collector 111, and a negative electrode active substance 122 is provided on both surfaces of the negative electrode current collector 111. The other negative electrodes have the same structure. These negative electrodes are on the inner side of the layered structure.

The positive electrode 102 includes a positive electrode current collector 112 a, and a positive electrode active substance 123 a is provided on a surface of the positive electrode current collector 112 a. The positive electrode 102 including the positive electrode active substance 123 a on one surface is provided on the outer side of the layered structure in FIGS. 1A and 1B. Hence, the positive electrode current collector 112 a is on the outer side of the power storage device, so that the other surface of the positive electrode current collector 112 a is exposed. The positive electrode 103 on the inner side includes a positive electrode current collector 112 b, and a positive electrode active substance 123 b is provided on both surfaces of the positive electrode current collector 112 b. The other positive electrodes on the inner side of the layered structure have the same structure.

The separator 113 is provided so as to surround the negative electrode 101 and so as not to touch the exposed positive electrode current collector 112a.

As illustrated in FIG. 1B, the negative electrode 101, the positive electrode 102, and the positive electrode 103 are stored in an exterior body 150. The exterior body 150 is filled with an ionic liquid 151. The separator 113 is impregnated with the ionic liquid 151 in some cases, in which case the power storage device can be made thinner than that using a polymer solid electrolyte.

The separator 113 surrounds the negative electrode 101. The separator 113 preferably has an end portion 114 that closes the separator 113. That is, the separator 113 is closed at the end portion 114, thereby fixing the negative electrode 101.

In the power storage device, the positive electrodes and the negative electrodes are brought into close contact; as a result, the thickness of the power storage device can be reduced and the positive electrodes and the negative electrodes can be fixed.

A battery is formed in a region where a positive electrode active substance faces a negative electrode active substance. The power storage device having the layered structure can have increased capacity.

Although not all illustrated in FIGS. 1A and 1B, the power storage device has the following layered structure in order to obtain a battery capacity of 300 mAh. The number of positive electrodes 103 including the active substance on each surface is five; the positive electrodes 102 including the active substance on one surface, two; the negative electrodes 101 including the active substance on each surface, six; and the separators 113, six. Note that the number of separators can be reduced by changing the arrangement thereof, in which case the weight of the power storage device can be reduced.

A battery is formed in a region where a positive electrode active substance faces a negative electrode active substance; thus, the power storage device in FIGS. 1A and 1B includes 12 batteries layered. The number of layered batteries can be determined by the battery capacity.

The separator 113 is provided so as to surround the negative electrode 101. In view of the problems in conventional examples, the separator 113 is preferably arranged so as not to touch the surface of the positive electrode current collector 112a. Any electrode can be surrounded by the separator 113 as long as each surface is provided with the active substance.

Although not illustrated in FIGS. 1A and 1B, a protective film may be formed on the surface of the positive electrode current collector 112a which is exposed on the outside. The protective film can be made of a material that is less impregnated with an ionic liquid than cellulose is, e.g., polypropylene, polyethylene, polybutene, nylon, polyester, polysulfone, polyacrylonitrile, polyvinylidene fluoride, or tetrafluoroethylene.

Materials and the like of the components in the aforementioned structure will be described.

<Separator>

A separator is provided between a positive electrode and a negative electrode to prevent them from touching each other. The separator includes pores so as not to prevent the transfer of ions between the positive electrode and the negative electrode. Electrolytes other than a solid can pass through the pores. The state of the separator is preferably unlikely to change with a usage environment of the power storage device, even in a high-temperature environment. The change in state is acceptable as long as the positive electrode and the negative electrode are not in contact with each other.

For example, cellulose can be used as the separator. The thickness of the separator is greater than or equal to 5 μm and less than or equal to 100 μm, preferably greater than or equal to 40 μm and less than or equal to 60 μm. The separator may have a layered structure with the same or different materials.

The separator preferably has a tubular shape so as to be easy to handle. In such a case, the negative electrode and the like are enclosed in the tubular separator and then can be provided to overlap with the positive electrode and the like.

The tubular separator is preferable because the positive electrode and the negative electrode are unlikely to touch each other when the power storage device is bent. The negative electrode enclosed in the tubular separator can be prevented from protruding from the separator even when it is away from a predetermined position in bending of the power storage device.

Such a tubular shape includes a first opening and a second opening that face each other and has a hollow structure.

The positive electrode or the negative electrode is enclosed in the hollow structure. The separator, the positive electrode, and the negative electrode are brought into close contact so as to be thin and flat; as a result, the hollow structure collapses.

The separator may have a bag-like shape, which includes an opening. The bag-like shape includes fewer openings than the tubular shape, but has a hollow structure like the tubular shape. Because of fewer openings, the positive electrode or the negative electrode is less likely to be exposed in the hollow structure, reducing a contact between the positive electrode and the negative electrode.

A thin-film (sheet-like) separator may also be used in view of the function of the separator. The positive electrode or the negative electrode can be arranged between thin-film separators.

<Ionic Liquid>

An ionic liquid is a salt in the liquid state and has high ion mobility (conductivity). An ionic liquid contains a cation and an anion. Examples of the ionic liquid include an imidazolium-based ionic liquid and a pyridinium-based ionic liquid.

Examples of the cation in the ionic liquid include a heterocyclic cation, an aromatic cation, a quaternary ammonium cation, a quaternary sulfonium cation, a quaternary phosphonium cation, a tertiary sulfonium cation, an acyclic quaternary ammonium cation, an acyclic quaternary phosphonium cation, and an aromatic cation. Note that the cation is not limited thereto.

Examples of the anion in the ionic liquid include a monovalent amide-based anion, a monovalent methide-based anion, a fluorosulfonic acid anion ($SO_3F^-$), a perfluoroalkyl sulfonic acid anion, tetrafluoroborate ($BF_4^-$), perfluoroalkylborate, hexafluorophosphate ($PF_6^-$), and perfluoroalkylphosphate. An example of the monovalent amide-based anion is $(C_nF_{2n+1}SO_2)_2N^-$ ($0 \leq n \leq 3$), and an example of the cyclic monovalent amide-based anion is $CF_2(CF_2SO_2)_2N^-$. An example of the monovalent methide-based anion is $(C_nF_{2n+1}SO_2)_3C^-$ ($0 \leq n \leq 3$), and an example of the cyclic monovalent methide-based anion is $CF_2(CF_2SO_2)_2C^-(CF_3SO_2)$. An example of the perfluoroalkyl sulfonic acid anion is $(C_mF_{2m+1}SO_3)^-$ ($0 \leq m \leq 4$). An example of the perfluoroalkylborate is $\{BF_n(C_mH_kF_{2m+1-k})_{4-n}\}^-$ ($0 \leq n \leq 3$, $1 \leq m \leq 4$, and $0 \leq k \leq 2m$). An example of the perfluoroalkylphosphate is $\{PF_n(C_mH_kF_{2m+1-k})_{6-n}\}^-$ ($0 \leq n \leq 5$, $1 \leq m \leq 4$, and $0 \leq k \leq 2m$). Note that the anion is not limited thereto.

An ionic liquid represented by General Formula (G1) can be used.

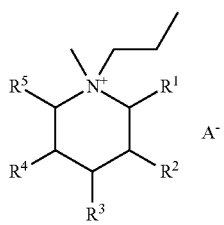

(G1)

Examples of the anion (A$^-$) in General Formula (G1) include a monovalent amide-based anion, a monovalent methide-based anion, a fluorosulfonic acid anion (SO$_3$F$^-$), a perfluoroalkyl sulfonic acid anion, tetrafluoroborate (BF$_4^-$), perfluoroalkylborate, hexafluorophosphate (PF$_6^-$), and perfluoroalkylphosphate. An example of the monovalent amide-based anion is (C$_n$F$_{2n+1}$SO$_2$)$_2$N$^-$ (0≤n≤3), and an example of the cyclic monovalent amide-based anion is CF$_2$(CF$_2$SO$_2$)$_2$N$^-$. An example of the monovalent methide-based anion is (C$_n$F$_{2n+1}$SO$_2$)$_3$C$^-$ (0≤n≤3), and an example of the cyclic monovalent methide-based anion is CF$_2$(CF$_2$SO$_2$)$_2$C$^-$(CF$_3$SO$_2$). An example of the perfluoroalkyl sulfonic acid anion is (C$_m$F$_{2m+1}$SO$_3$)$^-$ (0≤m≤4). An example of the perfluoroalkylborate is {BF$_n$(C$_m$H$_k$F$_{2m+1-k}$)$_{4-n}$}$^-$ (0≤n≤3, 1≤m≤4, and 0≤k≤2 m). An example of the perfluoroalkylphosphate is {PF$_n$(C$_m$H$_k$F$_{2m+1-k}$)$_{6-n}$}$^-$ (0≤n≤5, 1≤m≤4, and 0≤k≤2 m). Note that the anion is not limited thereto.

In the cation in General Formula (G1), R$^1$ to R$^5$ represent any of a hydrogen atom, an alkyl group, a methoxy group, a methoxymethyl group, and a methoxyethyl group each having 1 to 20 carbon atoms. When one of R$^1$ to R$^5$ is any of an alkyl group, a methoxy group, a methoxymethyl group, and a methoxyethyl group each having 1 to 20 carbon atoms, the other four of R$^1$ to R$^5$ are hydrogen atoms. When two of R$^1$ to R$^5$ are any of an alkyl group, a methoxy group, a methoxymethyl group, and a methoxyethyl group each having 1 to 20 carbon atoms, the other three of R$^1$ to R$^5$ are hydrogen atoms. When three of R$^1$ to R$^5$ are any of an alkyl group, a methoxy group, a methoxymethyl group, and a methoxyethyl group each having 1 to 20 carbon atoms, the other two of R$^1$ to R$^5$ are hydrogen atoms. When four of R$^1$ to R$^5$ are any of an alkyl group, a methoxy group, a methoxymethyl group, and a methoxyethyl group each having 1 to 20 carbon atoms, the other one of R$^1$ to R$^5$ is a hydrogen atom.

Examples of specific structures of the cation in General Formula (G1) are Structural Formulae (100) to (116). Note that R$^1$ and R$^5$ in the cation of General Formula (G1) are symmetrical with respect to a line segment connecting N$^+$ of piperidine and R$^3$. Similarly, R$^2$ and R$^4$ in the cation of General Formula (G1) are also symmetrical. For example, the cations with a methyl group at R$^1$ or R$^2$ are shown in Structural Formulae (101) and (102), and structural formulae that are equivalent to Structural Formulae (101) and (102) are not shown. In other words, the structural formula with a methyl group at R$^5$ instead of R$^1$ in Structural Formula (101) and the structural formula with a methyl group at R$^4$ instead of R$^2$ in Structural Formula (102) are equivalent to and have the same property as Structural Formulae (101) and (102), respectively, and are therefore omitted. The same applies to the other structural formulae shown below. Note that the cation is not limited thereto.

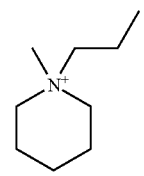

(100)

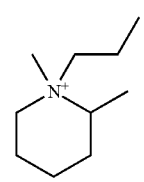

(101)

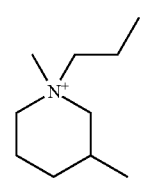

(102)

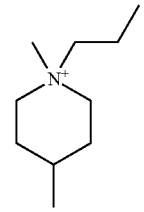

(103)

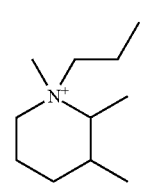

(104)

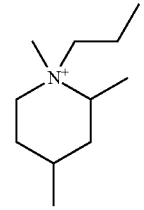

(105)

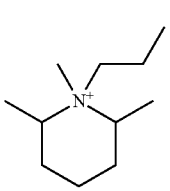

(106)

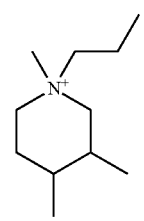

(107)

(108) 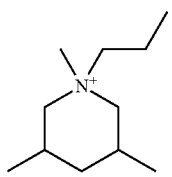

(109) 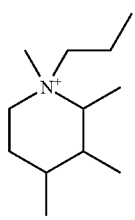

(110) 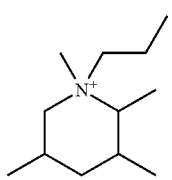

(111) 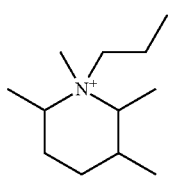

(112) 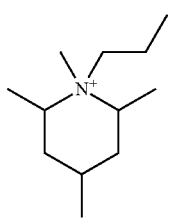

(113) 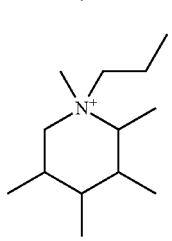

(114) 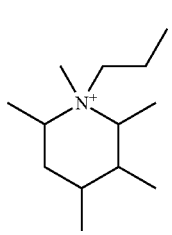

(115) 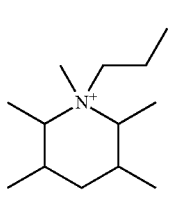

(116) 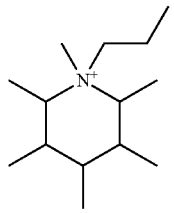

An ionic liquid represented by General Formula (G2) can be used.

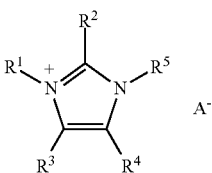

(G2)

The anion ($A^-$) in General Formula (G2) represents any of a monovalent amide-based anion, a monovalent methide-based anion, a fluorosulfonic acid anion, a fluoroalkyl sulfonic acid anion, tetrafluoroborate, fluoroalkylborate, hexafluorophosphate, and fluoroalkylphosphate. Note that the anion is not limited thereto.

In the cation in General Formula (G2), $R^1$ represents an alkyl group having 1 to 4 carbon atoms; $R^2$ to $R^4$ each independently represent a hydrogen atom or an alkyl group having 1 to 4 carbon atoms; and $R^5$ represents a straight chain formed of four or more atoms selected from C, O, Si, N, S, and P.

The main chain represented by $R^5$ may have a substituent. Examples of the substituent include an alkyl group and an alkoxy group.

Note that in General Formula (G2), $R^5$ is the substituent having the main chain composed of four or more selected from C, O, Si, N, S, and P; alternatively, $R^2$ or $R^3$ may be a substituent having the main chain composed of four or more selected from C, O, Si, N, S, and P. In addition, the number of substituents having the main chain composed of four or more selected from C, O, Si, N, S, and P may be two or more, e.g., $R^1$ and $R^5$, $R^2$ and $R^5$, $R^2$ and $R^3$, or $R^1$, $R^2$, and $R^5$.

The alkyl group in the cation in General Formula (G2) may be either a straight-chain alkyl group or a branched-chain alkyl group. For example, the alkyl group may be an ethyl group or a tert-butyl group. In the cation in General Formula (G2), it is preferable that $R^5$ do not have an oxygen-oxygen bond (peroxide). An oxygen-oxygen single bond extremely easily breaks and is reactive; thus, the ionic liquid having the bond might be explosive and is not suitable for a power storage device.

Specific examples of the cation in General Formula (G2) include Structural Formulae (201) to (243), Structural Formulae (301) to (327), Structural Formulae (401) to (404), Structural Formulae (501) to (527), Structural Formulae (601) to (604), Structural Formulae (701) to (704), Structural Formulae (801) to (804), Structural Formulae (901) to (904), and Structural Formulae (911) to (923). Note that the cation is not limited thereto.

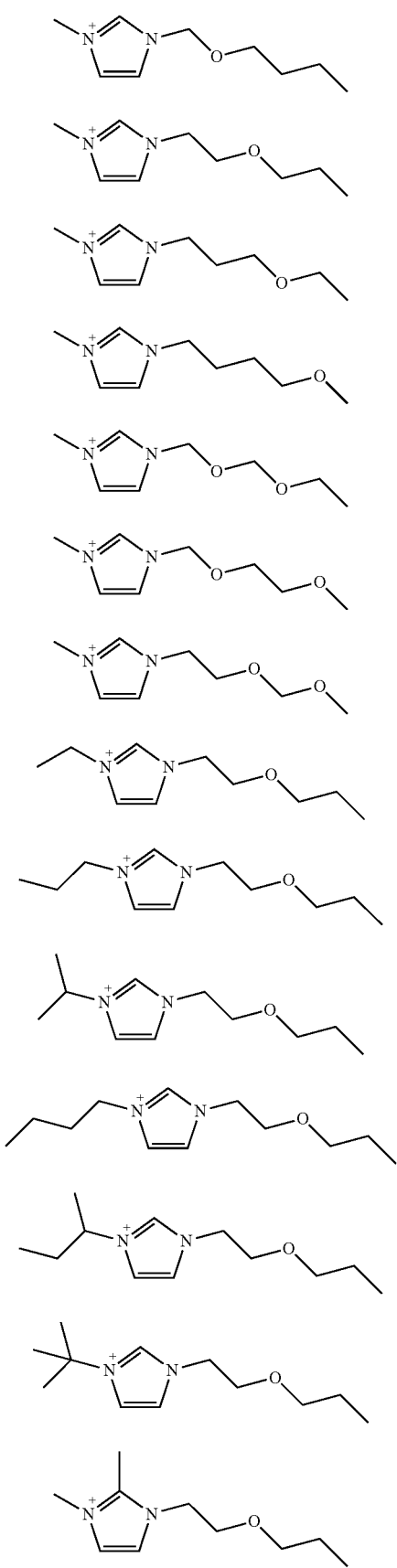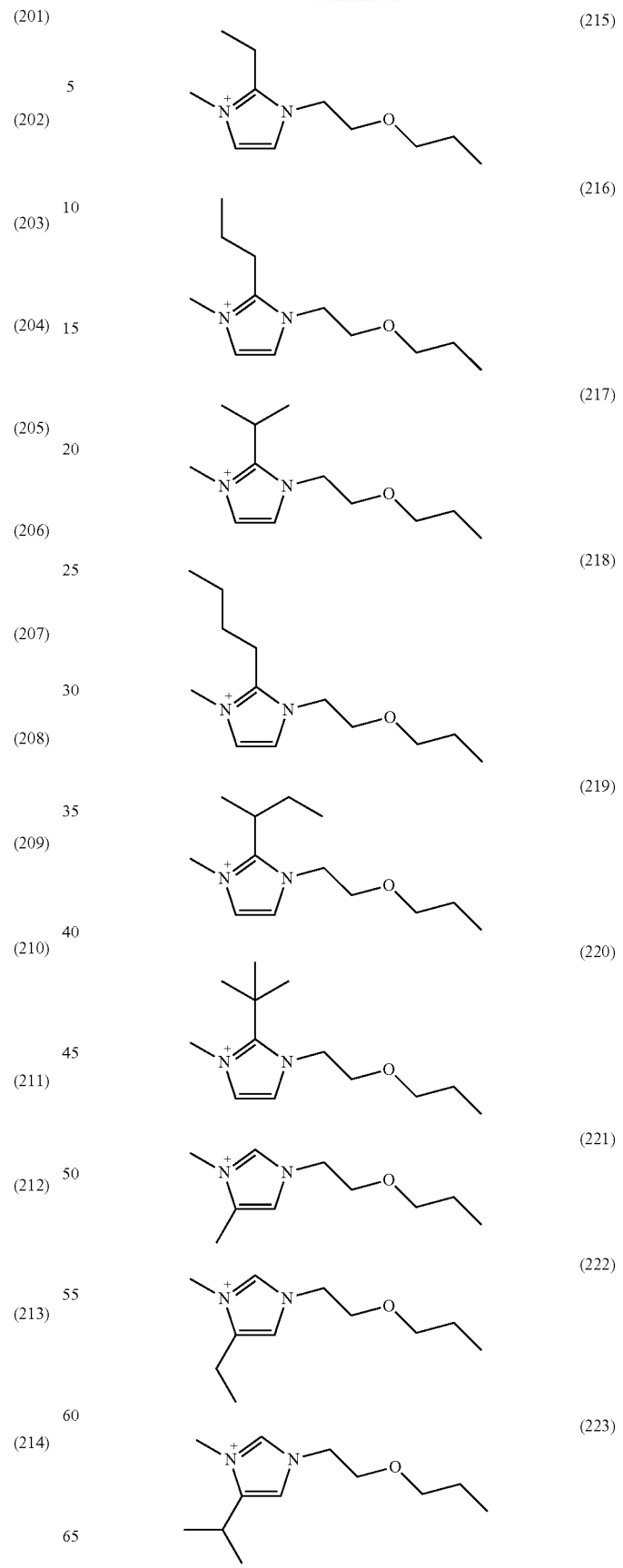

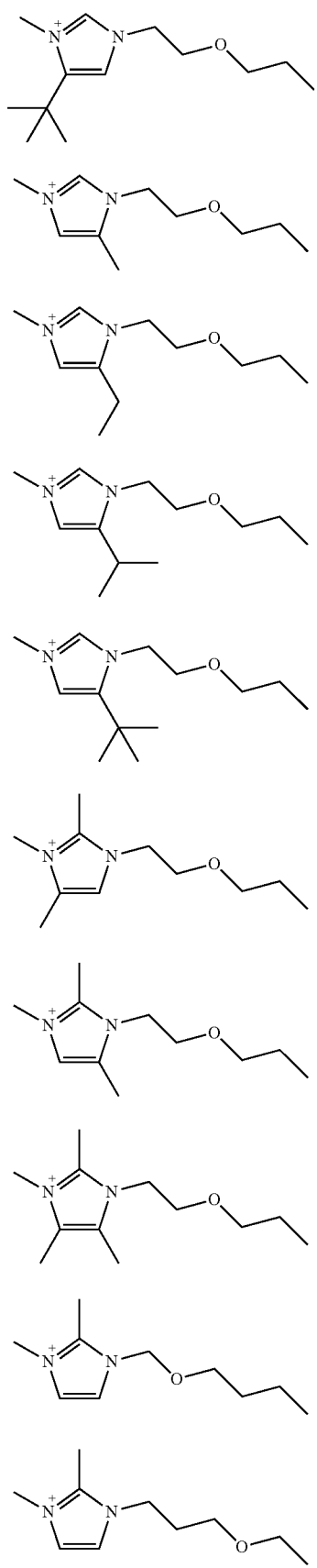

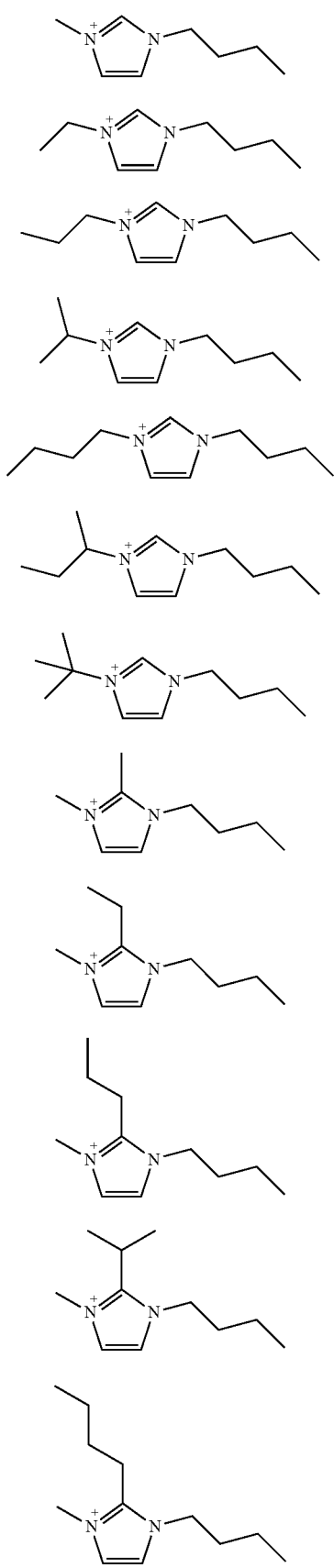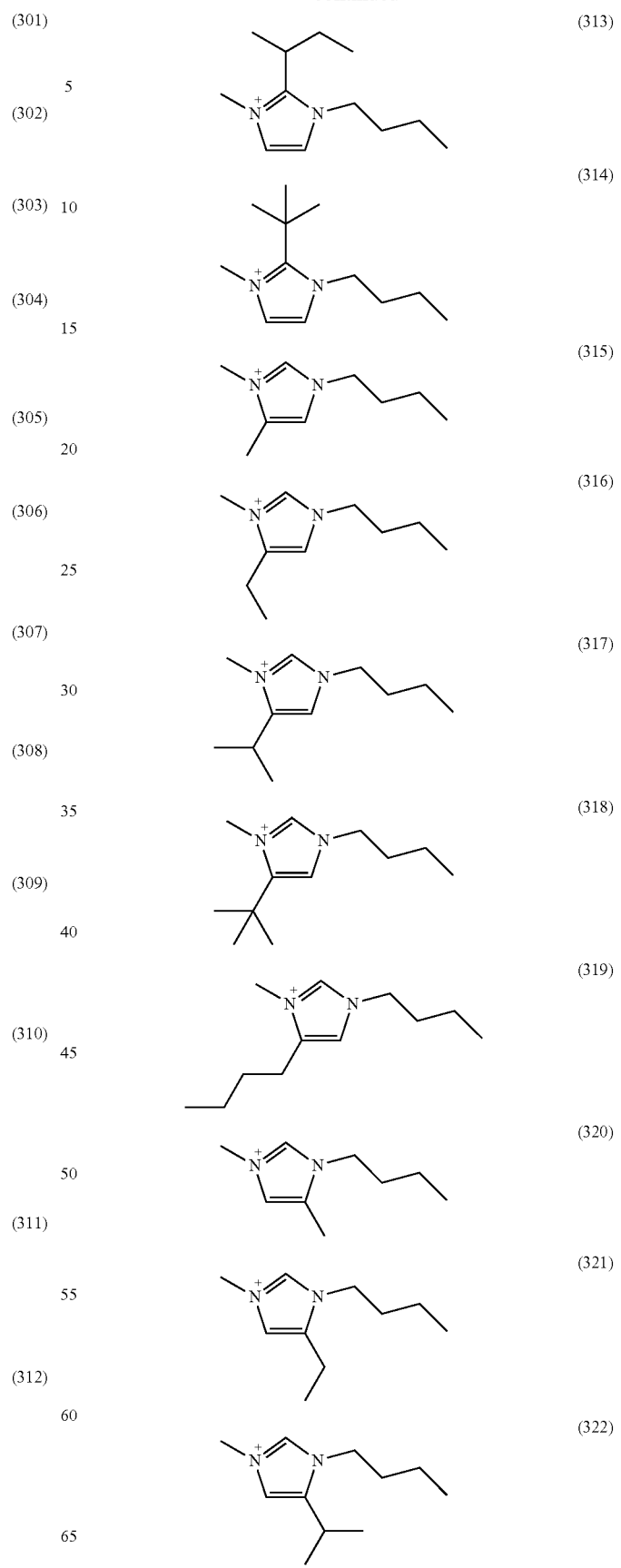

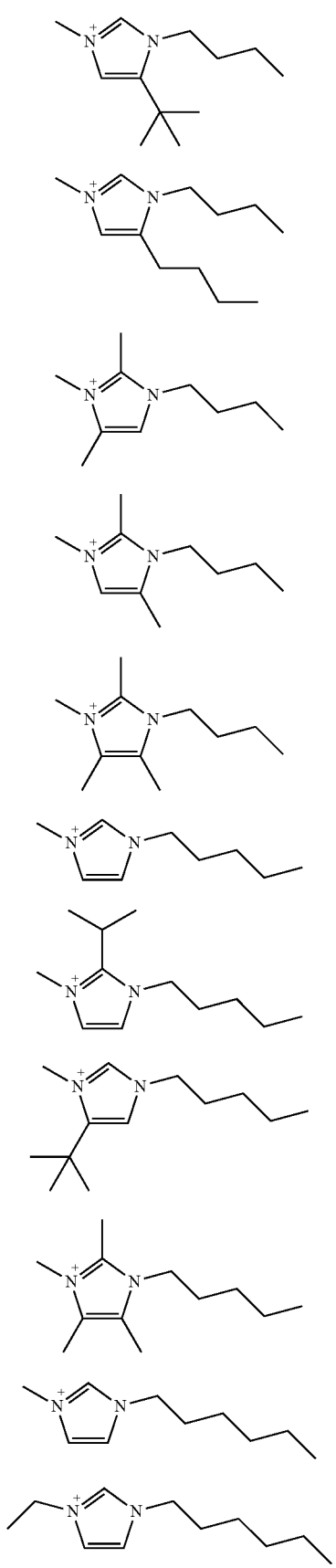
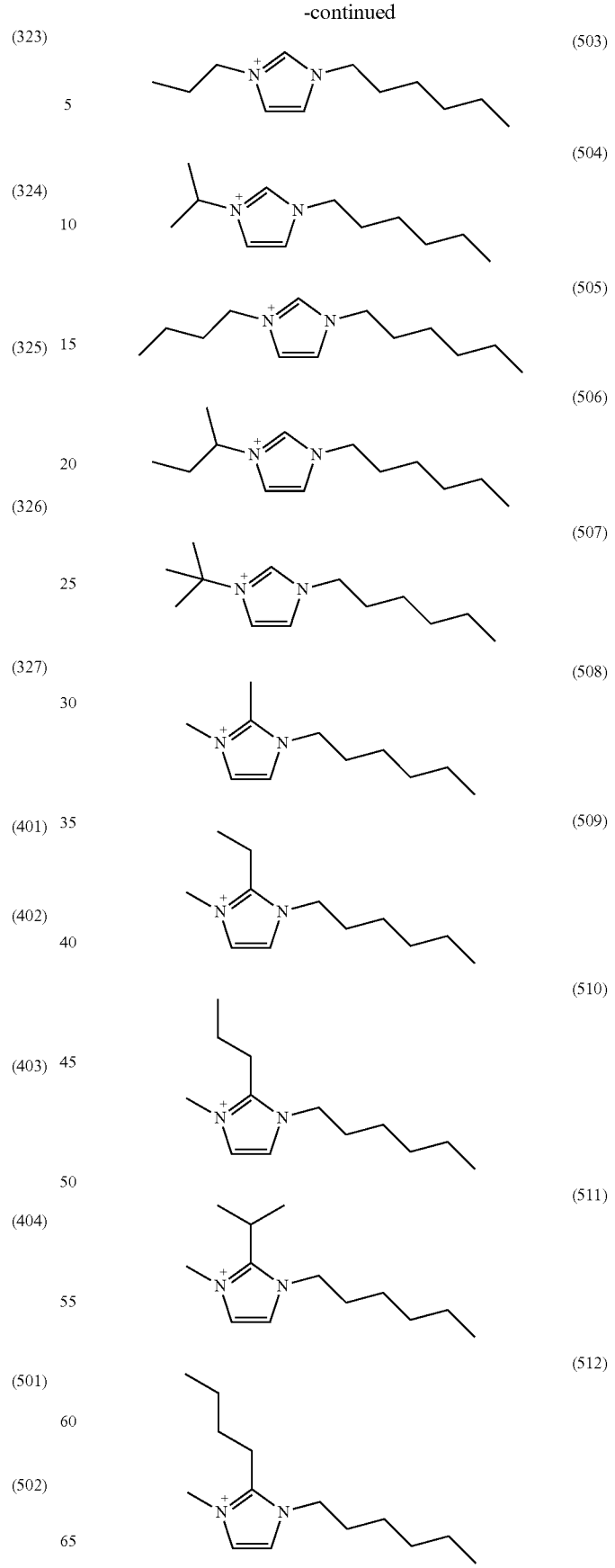

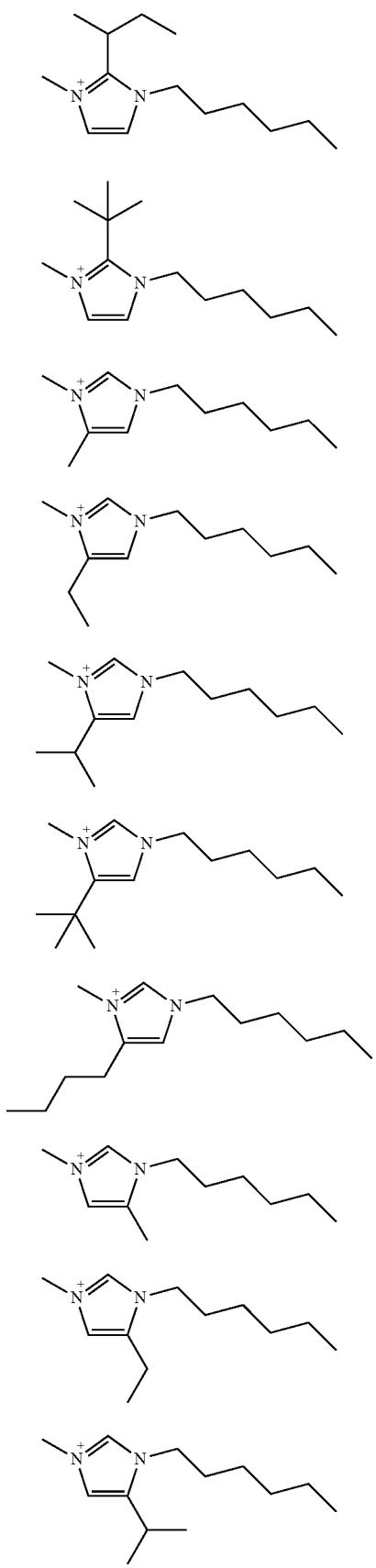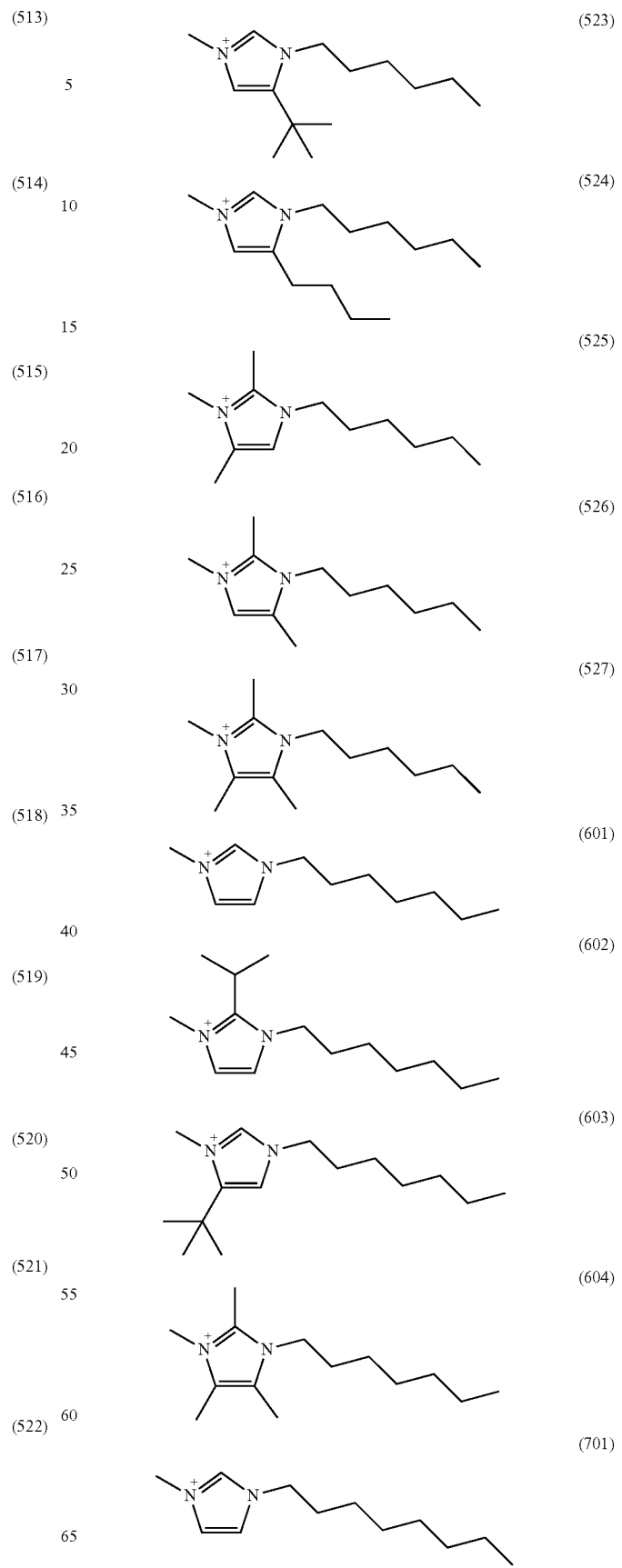

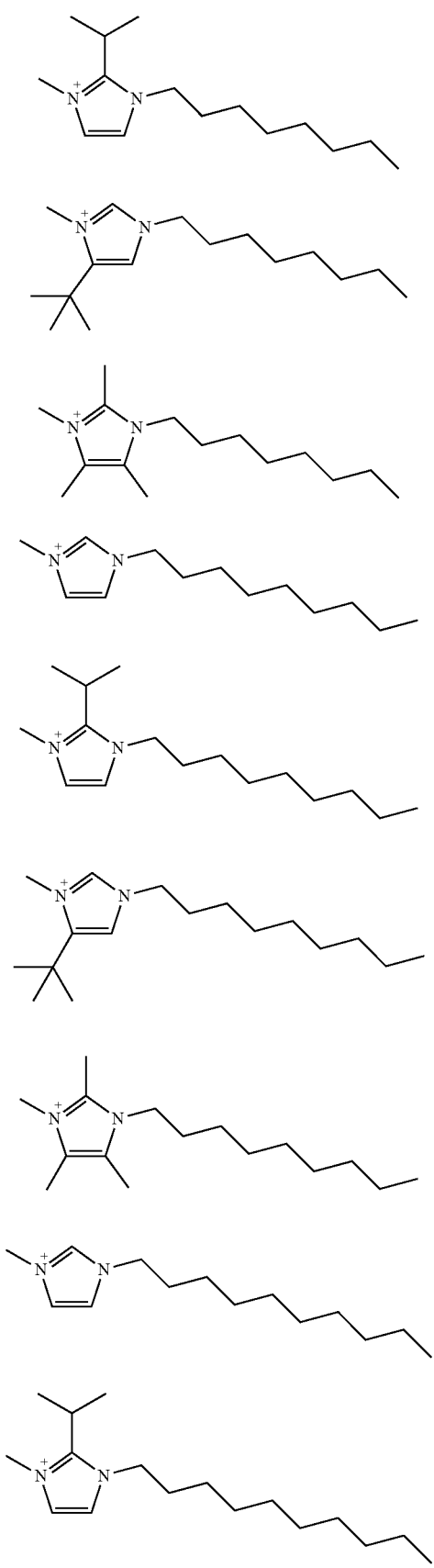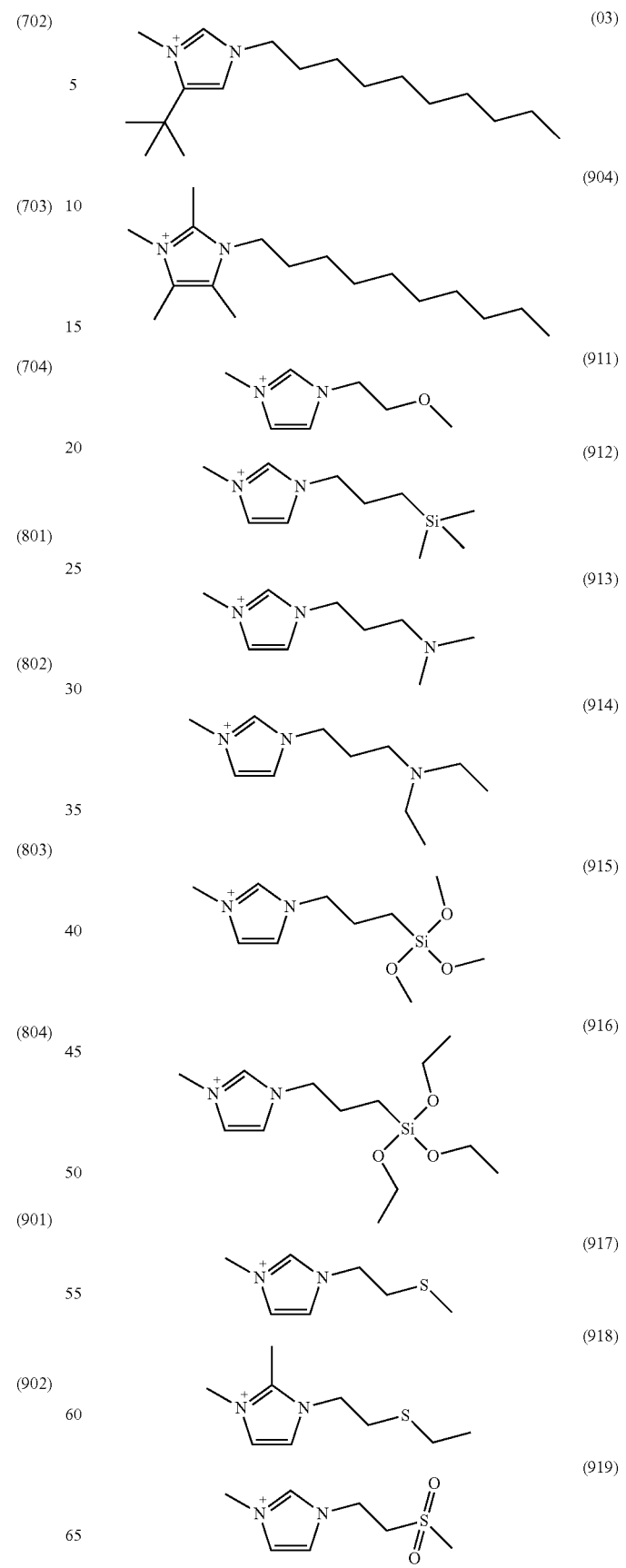

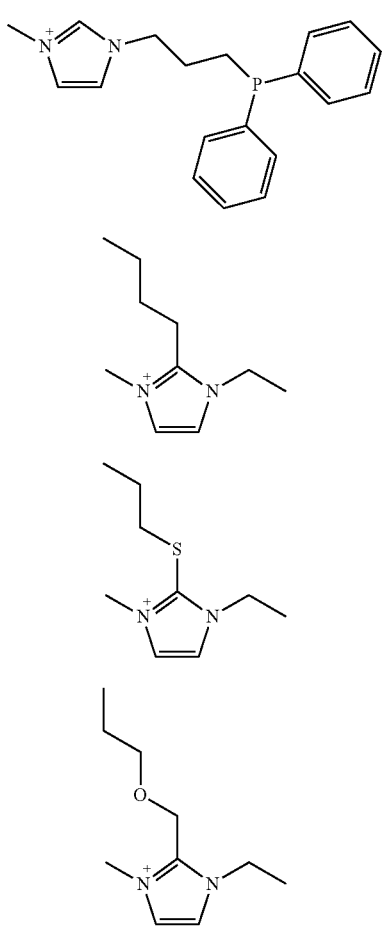

(920)

(921)

(922)

(923)

In the above formulae, symmetry is broken when different substituents are bonded to N, which lowers a melting point. Accordingly, for example, a reduction in ionic conductivity can be inhibited even in an environment at a temperature lower than normal temperature.

When a substituent having an electron-donating property such as a methyl group or a methoxy group is introduced to a hetero cycle, the electron density of the hetero cycle decreases, the range of stable potential (also referred to as a potential window) can be widened, and strong reduction resistance can be obtained. This improves the cycle performance of a power storage device. Note that the substituent having an electron-donating property is more effective when being introduced at the ortho-position of the hetero cycle.

An ionic liquid represented by General Formula (G3) can be used.

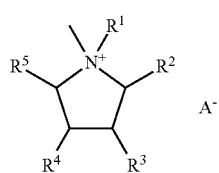

(G3)

Examples of the anion ($A^-$) in General Formula (G3) include a monovalent amide-based anion, a monovalent methide-based anion, a fluorosulfonic acid anion ($SO_3F$), a perfluoroalkyl sulfonic acid anion, tetrafluoroborate ($BF_4^-$), perfluoroalkylborate, hexafluorophosphate ($PF_6^-$), and perfluoroalkylphosphate. An example of the monovalent amide-based anion is $(C_nF_{2n+1}SO_2)_2N^-$ ($0 \le n \le 3$), and an example of the cyclic monovalent amide-based anion is $CF_2(CF_2SO_2)_2N^-$. An example of the monovalent methide-based anion is $(C_nF_{2n+1}SO_2)_3C^-$ ($0 \le n \le 3$), and an example of the cyclic monovalent methide-based anion is $CF_2(CF_2SO_2)_2C^-$ ($CF_3SO_2$). An example of the perfluoroalkyl sulfonic acid anion is $(C_mF_{2m+1}SO_3)^-$ ($0 \le m \le 4$). An example of the perfluoroalkylborate is $\{BF_n(C_mH_kF_{2m+1-k})_{4-n}\}^-$ ($0 \le n \le 3$, $1 \le m \le 4$, and $0 \le k \le 2m$). An example of the perfluoroalkylphosphate is $\{PF_n(C_mH_kF_{2m+1-k})_{6-n}\}^-$ ($0 \le n \le 5$, $1 \le m \le 4$, and $0 \le k \le 2m$). Note that the anion is not limited thereto.

In the cation in General Formula (G3), $R^1$ represents an alkyl group having 1 to 4 carbon atoms; one or two of $R^2$ to $R^5$ represent any of an alkyl group, a methoxy group, a methoxymethyl group, and a methoxyethyl group each having 1 to 20 carbon atoms; and the other three or two of $R^2$ to $R^5$ represent a hydrogen atom.

Examples of the cation in General Formula (G3) are Structural Formulae (250) to (269). Note that $R^2$ and $R^5$ in the cation of General Formula (G3) are symmetrical with respect to a line segment connecting $N^+$ of pyrrolidine and the midpoint between $R^3$ and $R^4$. Similarly, $R^3$ and $R^4$ in the cation of General Formula (G3) are also symmetrical.

The cations with a methyl group at $R^2$ or $R^3$ are shown in Structural Formulae (251) and (252), and structural formulae that are equivalent to these structural formulae because of the above symmetry are not shown. In other words, the structural formula with a methyl group at $R^5$ instead of $R^2$ in Structural Formula (251) and the structural formula with a methyl group at $R^4$ instead of $R^3$ in Structural Formula (252) are equivalent to and have the same property as Structural Formulae (251) and (252), respectively, and are therefore omitted. The same applies to the other structural formulae shown below. Note that the cation is not limited thereto.

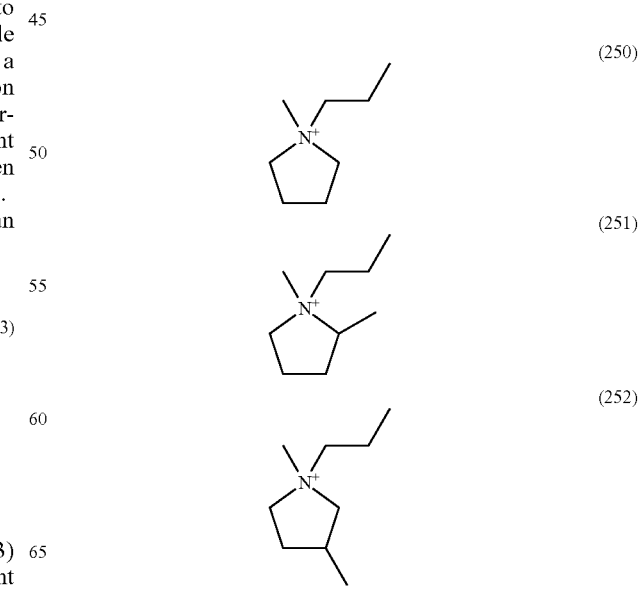

(250)

(251)

(252)

-continued (253) 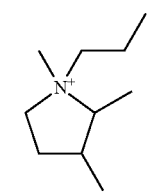

(254) 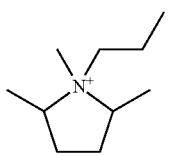

(255) 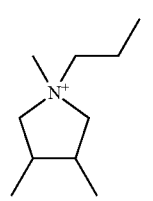

(256) 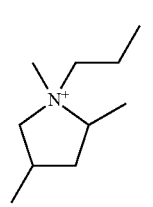

(257) 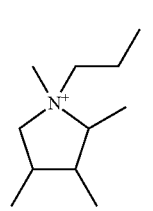

(258) 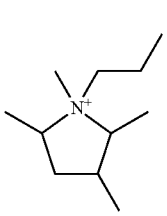

(259) 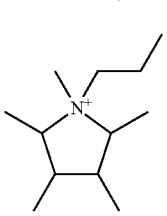

(260) 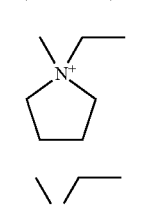

(261) 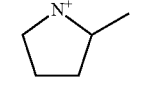

-continued (262) 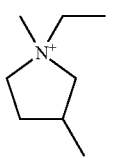

(263) 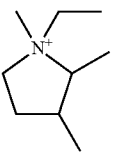

(264) 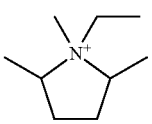

(265) 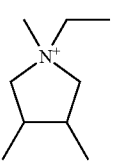

(266) 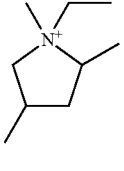

(267) 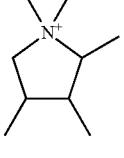

(268) 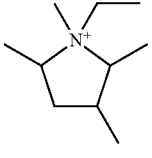

(269) 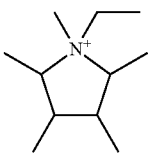

A five-membered-ring ionic liquid as in General Formulae (G2) and (G3) has lower viscosity and thus has higher ionic conductivity than a six-membered-ring ionic liquid as in General Formula (G1).

Furthermore, the ionic liquid may include a Spiro compound. For example, an ionic liquid represented by General Formula (G4), which includes a combination of five-membered rings as a spiro ring, can be used.

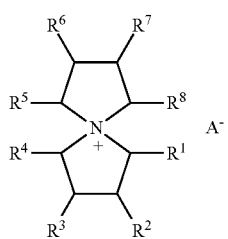

(G4)

Examples of the anion (A⁻) in General Formula (G4) include a monovalent amide-based anion, a monovalent methide-based anion, a fluorosulfonic acid anion ($SO_3F^-$), a perfluoroalkyl sulfonic acid anion, tetrafluoroborate ($BF_4^-$), perfluoroalkylborate, hexafluorophosphate ($PF_6^-$), and perfluoroalkylphosphate. An example of the monovalent amide-based anion is $(C_nF_{2n+1}SO_2)_2N^-$ (0≤n≤3), and an example of the cyclic monovalent amide-based anion is $CF_2(CF_2SO_2)_2N^-$. An example of the monovalent methide-based anion is $(C_nF_{2n+1}SO_2)_3C^-$ (0≤n≤3), and an example of the cyclic monovalent methide-based anion is $CF_2(CF_2SO_2)_2C^-(CF_3SO_2)$. An example of the perfluoroalkyl sulfonic acid anion is $(C_mF_{2+1}SO_3)^-$ (0≤m≤4). An example of the perfluoroalkylborate is $\{BF_n(C_mH_kF_{2m+1-k})_{4-n}\}^-$ (0≤n≤3, 1≤m≤4, and 0≤k≤2 m). An example of the perfluoroalkylphosphate is $\{PF_n(C_mH_kF_{2m+1-k})_{6-n}\}^-$ (0≤n≤5, 1≤m≤4, and 0≤k≤2 m). Note that the anion is not limited thereto.

In the cation in General Formula (G4), $R^1$ to $R^8$ each represent a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms.

A spiro ring may be a combination of a five-membered ring and a six-membered ring. For example, an ionic liquid represented by General Formula (G5) can be used. Note that the cation is not limited thereto.

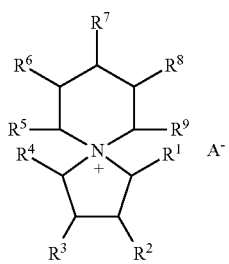

(G5)

Examples of the anion (A⁻) in General Formula (G5) include a monovalent amide-based anion, a monovalent methide-based anion, a fluorosulfonic acid anion ($SO_3F^-$), a perfluoroalkyl sulfonic acid anion, tetrafluoroborate ($BF_4^-$), perfluoroalkylborate, hexafluorophosphate ($PF_6^-$), and perfluoroalkylphosphate. An example of the monovalent amide-based anion is $(C_nF_{2n+1}SO_2)_2N^-$ (0≤n≤3), and an example of the cyclic monovalent amide-based anion is $CF_2(CF_2SO_2)_2N^-$. An example of the monovalent methide-based anion is $(C_nF_{2n+1}SO_2)_3C^-$ (0≤n≤3), and an example of the cyclic monovalent methide-based anion is $CF_2(CF_2SO_2)_2C^-(CF_3SO_2)$. An example of the perfluoroalkyl sulfonic acid anion is $(C_mF_{2m+1}SO_3)^-$ (0≤m≤4). An example of the perfluoroalkylborate is $\{BF_n(C_mH_kF_{2m+1-k})_{4-n}\}^-$ (0≤n≤3, 1≤m≤4, and 0≤k≤2 m). An example of the perfluoroalkylphosphate is $\{PF_n(C_mH_kF_{2m+1-k})_{6-n}\}^-$ (0≤n≤5, 1≤m≤4, and 0≤k≤2 m). Note that the anion is not limited thereto.

In General Formula (G5), $R^1$ to $R^9$ each represent a hydrogen atom, a straight-chain or branched-chain alkyl group having 1 to 4 carbon atoms, a straight-chain or branched-chain alkoxy group having 1 to 4 carbon atoms, or a straight-chain or branched-chain alkoxyalkyl group having 1 to 4 carbon atoms.

Other than the above-described Spiro rings, a combination of a five-membered ring and a seven-membered ring, a combination of a six-membered ring and a seven-membered ring, a combination of seven-membered rings, or the like may also be used. Specific examples of the cation in General Formula (G4), General Formula (G5), the Spiro ring with a combination of a five-membered ring and a seven-membered ring, the spiro ring with a combination of a six-membered ring and a seven-membered ring, and the spiro ring with a combination of seven-membered rings are represented by Structural Formulae (1300) to (1497). In a manner similar to that of General Formula (G3), only one structural formula among those having the same property and being equivalent because of symmetry is illustrated to avoid overlaps. Note that the cation is not limited to those shown below.

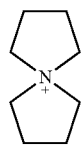

(1300)

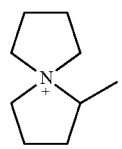

(1301)

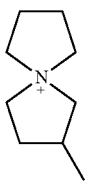

(1302)

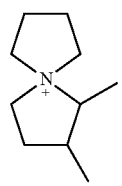

(1303)

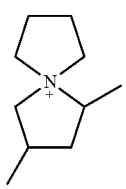

(1304)

(1305) 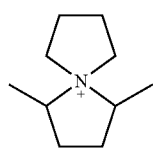
(1306) 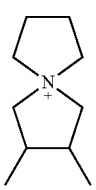
(1307) 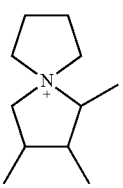
(1308) 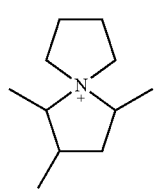
(1309) 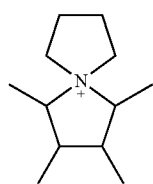
(1310) 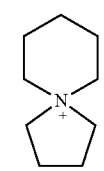
(1311) 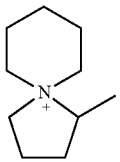
(1312) 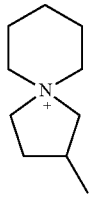
(1313) 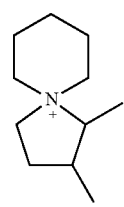
(1314) 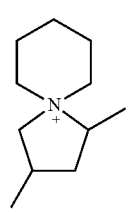
(1315) 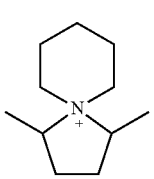
(1316) 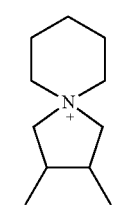
(1317) 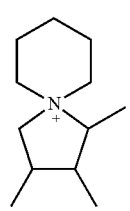
(1318) 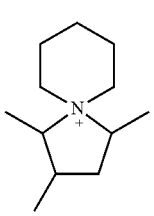
(1319) 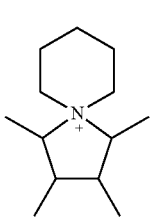
(1320) 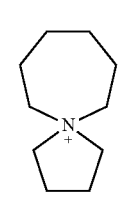

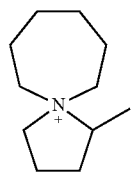 (1321)
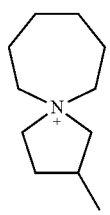 (1322)
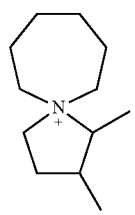 (1323)
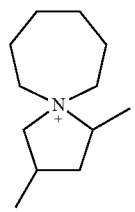 (1324)
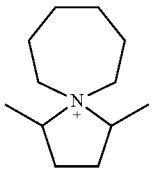 (1325)
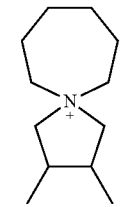 (1326)
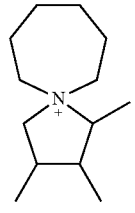 (1327)
(1328)
(1329)
(1330)
(1331)
(1332)
(1333)
(1334)
(1335)

(1336) 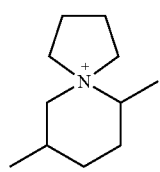
(1337) 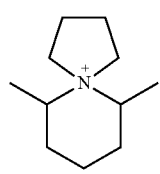
(1338) 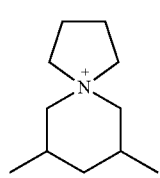
(1339) 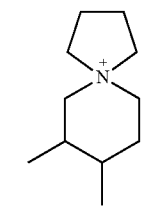
(1340) 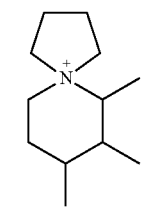
(1341) 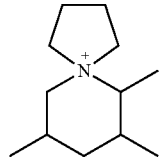
(1342) 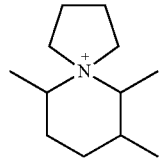
(1343) 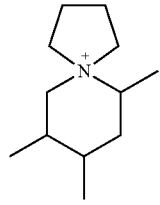
(1344) 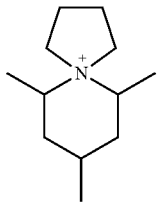
(1345) 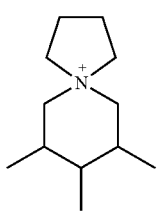
(1346) 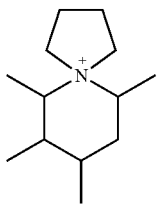
(1347) 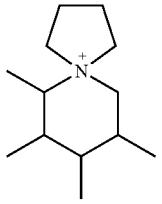
(1348) 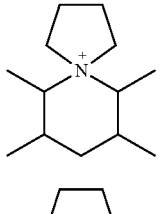
(1349) 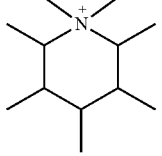
(1350) 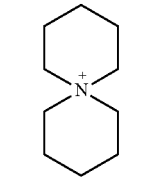
(1351) 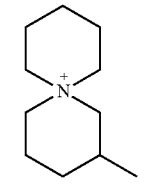

(1352) 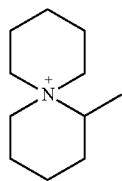
(1353) 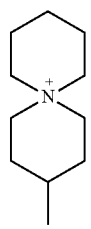
(1354) 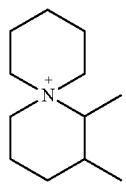
(1355) 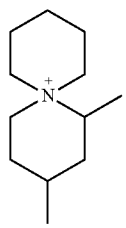
(1356) 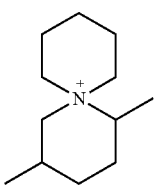
(1357) 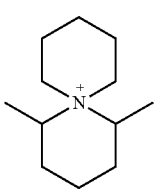
(1358) 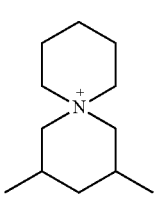
(1359) 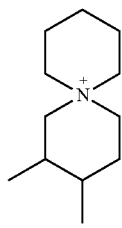
(1360) 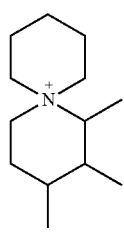
(1361) 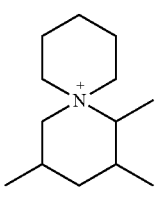
(1362) 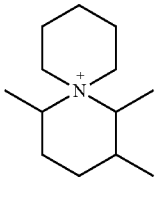
(1363) 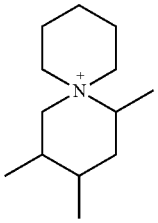
(1364) 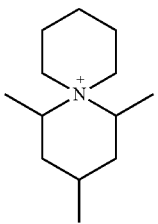
(1365) 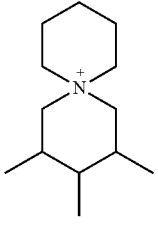

US 10,158,108 B2
(1366) 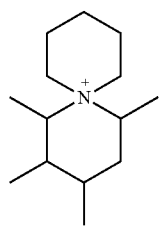
(1367) 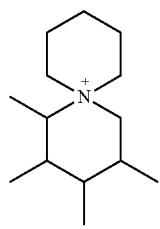
(1368) 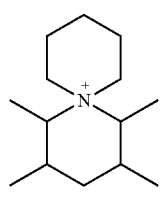
(1369) 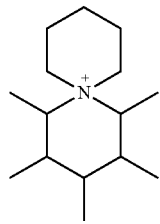
(1370) 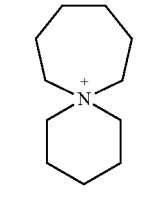
(1371) 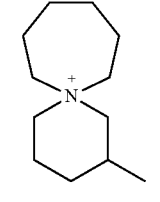
(1372) 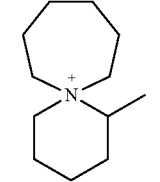
(1373) 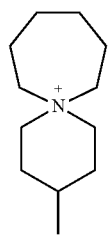
(1374) 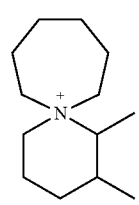
(1375) 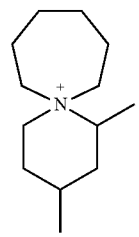
(1376) 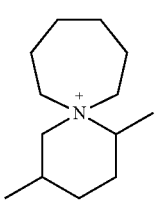
(1377) 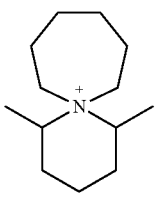
(1378) 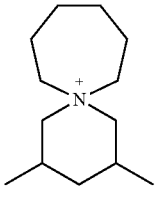
(1379) 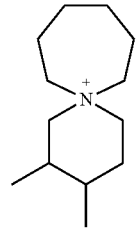

(1380) 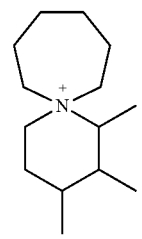
(1381) 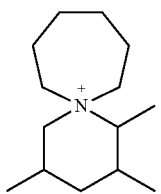
(1382) 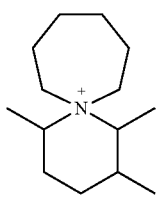
(1383) 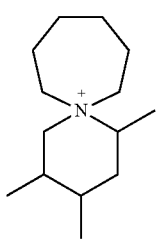
(1384) 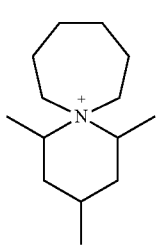
(1385) 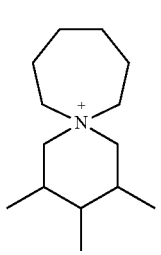
(1386) 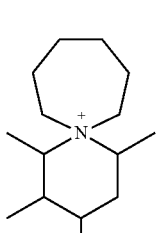
(1387) 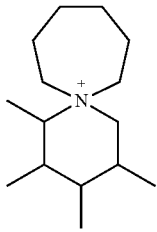
(1388) 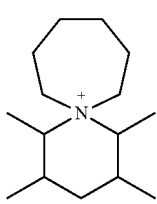
(1389) 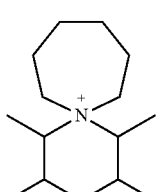
(1390) 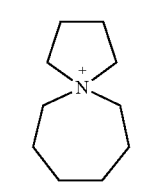
(1391) 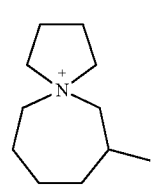
(1392) 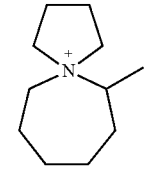
(1393) 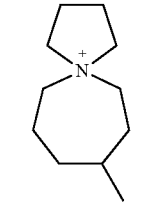
(1394) 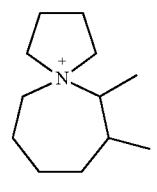

(1395) 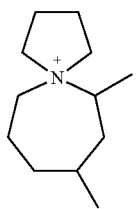
(1396) 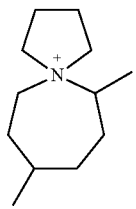
(1397) 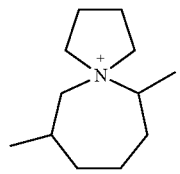
(1398) 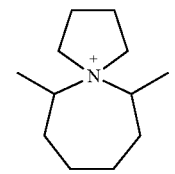
(1399) 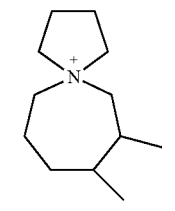
(1400) 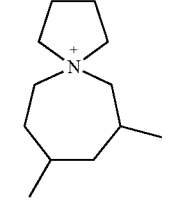
(1401) 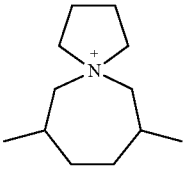
(1402) 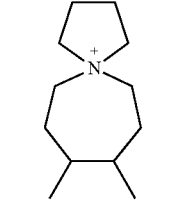
(1403) 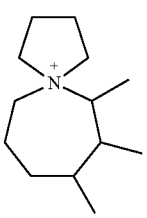
(1404) 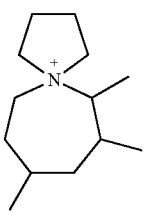
(1405) 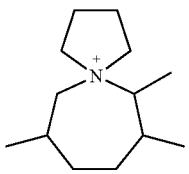
(1406) 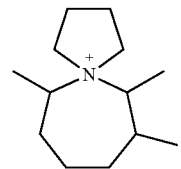
(1407) 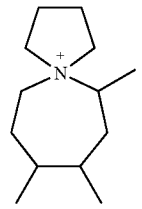
(1408) 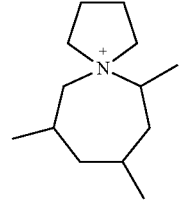
(1409) 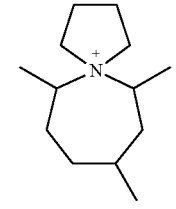

(1410) 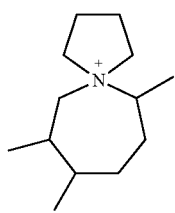
(1411) 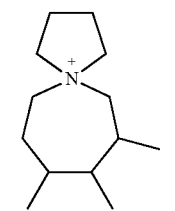
(1412) 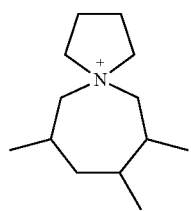
(1413) 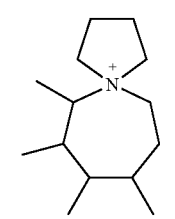
(1414) 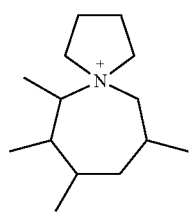
(1415) 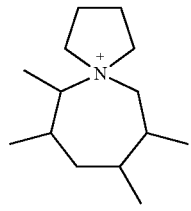
(1416) 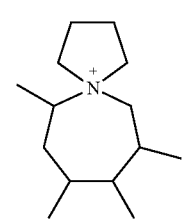
(1417) 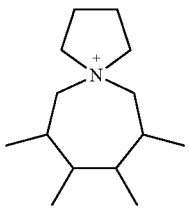
(1418) 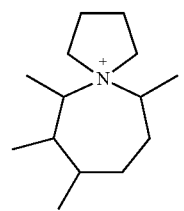
(1419) 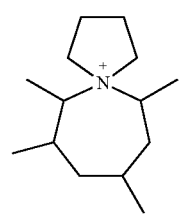
(1420) 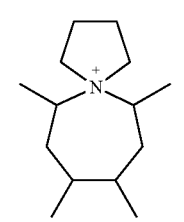
(1421) 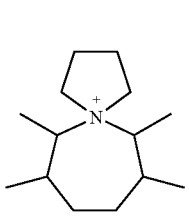
(1422) 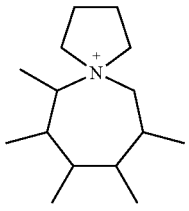
(1423) 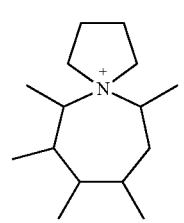

(1424) 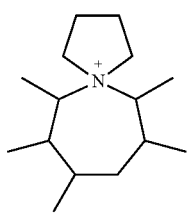
(1425) 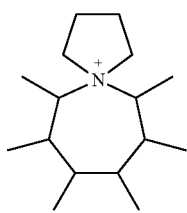
(1426) 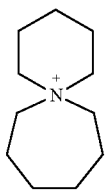
(1427) 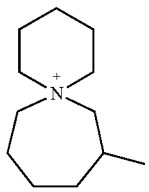
(1428) 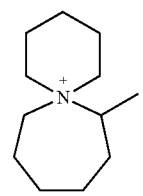
(1429) 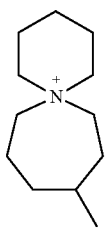
(1430) 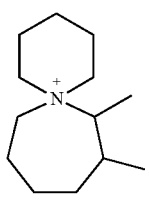
(1431) 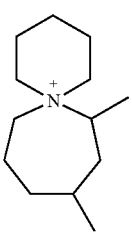
(1432) 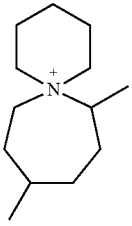
(1433) 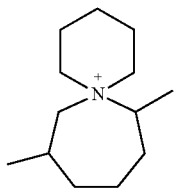
(1434) 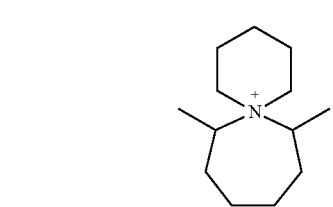
(1435) 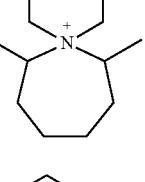
(1436) 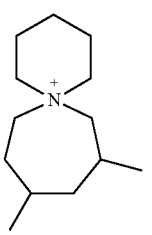
(1437) 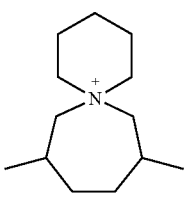

(1438) 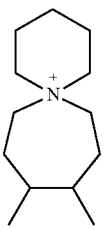
(1439) 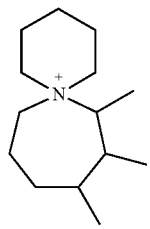
(1440) 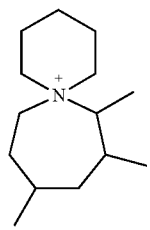
(1441) 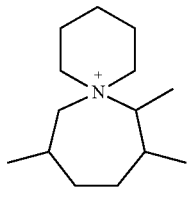
(1442) 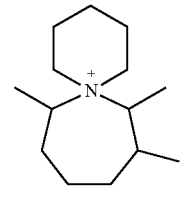
(1443) 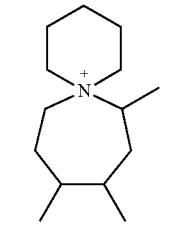
(1444) 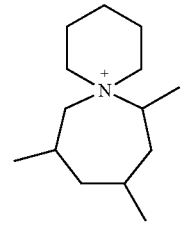
(1445) 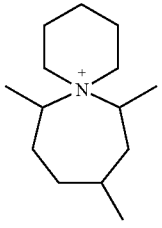
(1446) 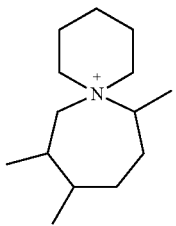
(1447) 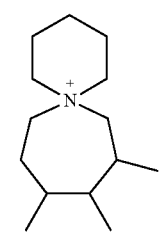
(1448) 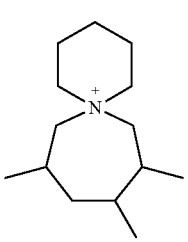
(1449) 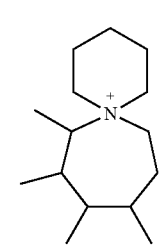
(1450) 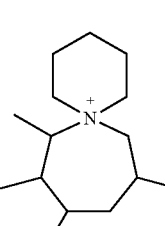
(1451) 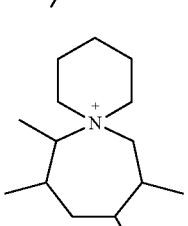

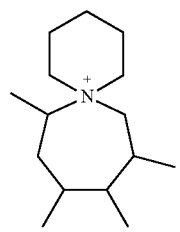 (1452)
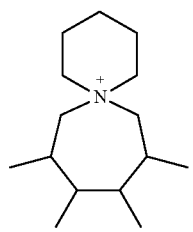 (1453)
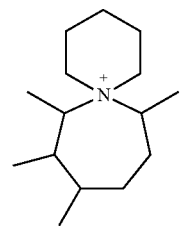 (1454)
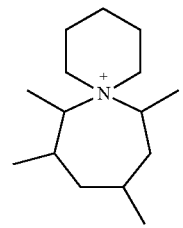 (1455)
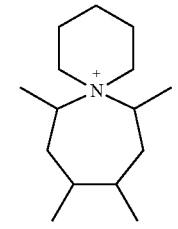 (1456)
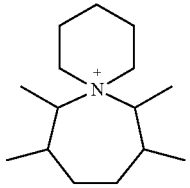 (1457)
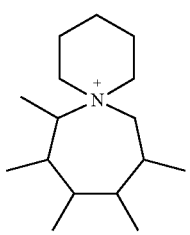 (1458)
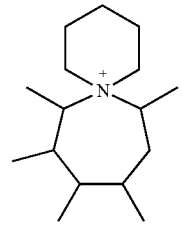 (1459)
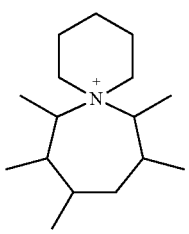 (1460)
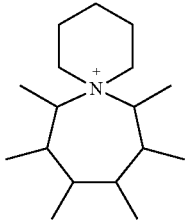 (1461)
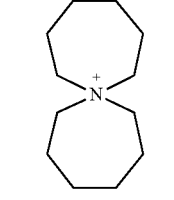 (1462)
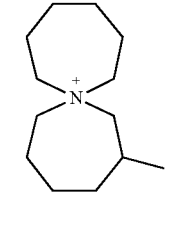 (1463)
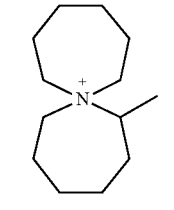 (1464)
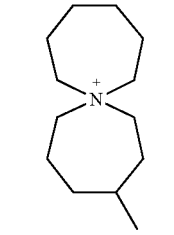 (1465)

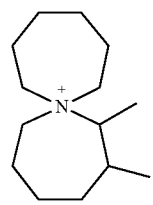 (1466)
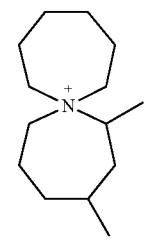 (1467)
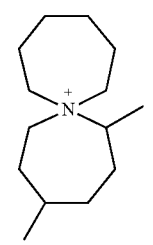 (1468)
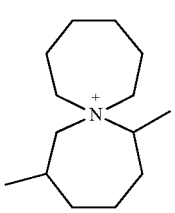 (1469)
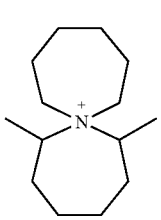 (1470)
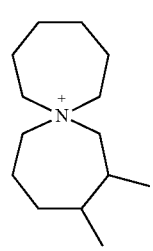 (1471)
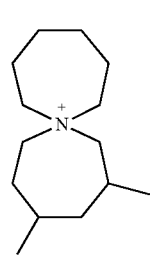 (1472)
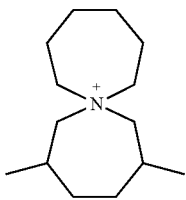 (1473)
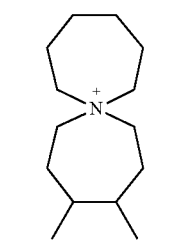 (1474)
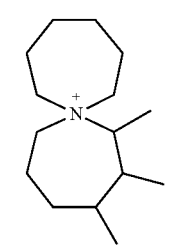 (1475)
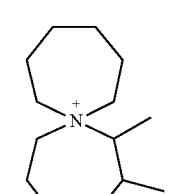 (1476)
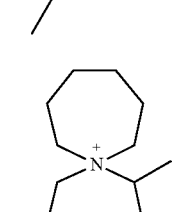 (1477)
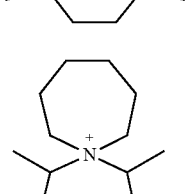 (1478)
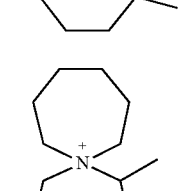 (1479)

(1480) 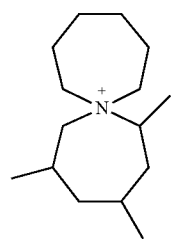
(1481) 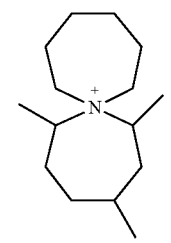
(1482) 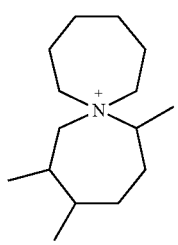
(1483) 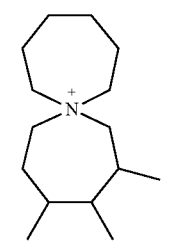
(1484) 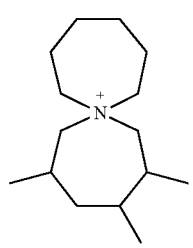
(1485) 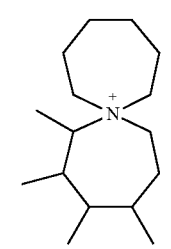
(1486) 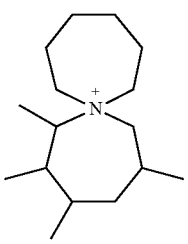
(1487) 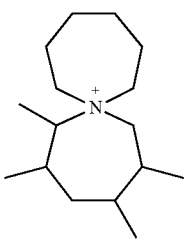
(1488) 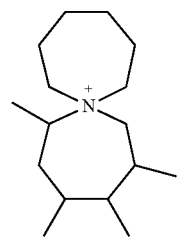
(1489) 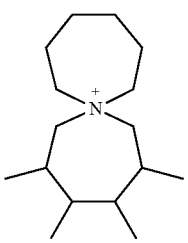
(1490) 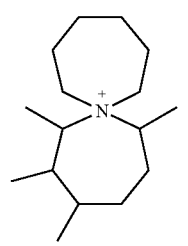
(1491) 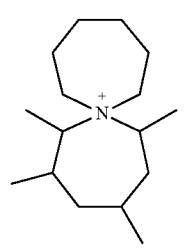

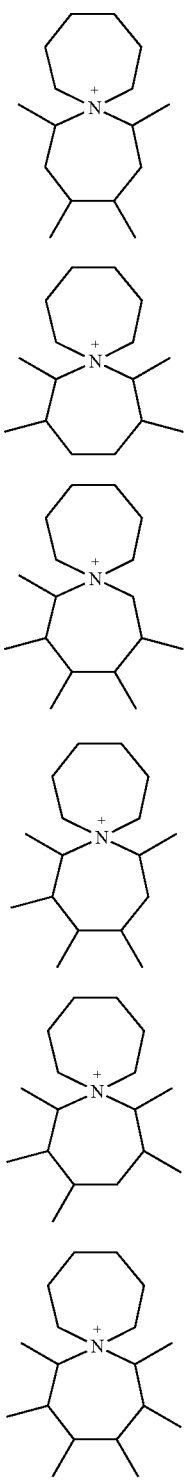

(1492)
(1493)
(1494)
(1495)
(1496)
(1497)

As an electrolyte dissolved in the above compound, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(FSO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

<Positive Electrode Current Collector>

The positive electrode current collector can be formed using a material having high conductivity such as a metal like stainless steel, gold, platinum, zinc, iron, copper, aluminum, or titanium, or an alloy thereof. Alternatively, the positive electrode current collector can be formed using an aluminum alloy to which an element that improves heat resistance, such as silicon, titanium, neodymium, scandium, or molybdenum, is added. Further alternatively, the positive electrode current collector may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, nickel, and the like. The positive electrode current collector can have a foil-like shape, a plate-like shape (sheet-like shape), a net-like shape, a punching-metal shape, an expanded-metal shape, or the like as appropriate. The positive electrode current collector preferably has a thickness of greater than or equal to 10 µm and less than or equal to 30 µm.

<Positive Electrode Active Substance>

As the positive electrode active substance, a compound such as $LiFeO_2$, $LiCoO_2$, $LiNiO_2$, $LiMn_2O_4$, $V_2O_5$, $Cr_2O_5$, or $MnO_2$ can be used.

Alternatively, lithium-containing composite salt, (general formula: $LiMPO_4$ where M is one or more of Fe(II), Mn(II), Co(II), and Ni(II)), can be used. Typical examples of $LiMPO_4$ are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a lithium-containing composite salt such as one represented by General Formula $Li_2MSiO_4$ (M is one or more of Fe(II), Mn(II), Co(II), and Ni(II)) can be used. Typical examples of General Formula $Li_2MSiO_4$ which can be used as the material are lithium compounds such as $Li_2FeSiO_4$, $Li_2NiSiO_4$, $Li_2CoSiO_4$, $Li_2MnSiO_4$, $Li_2Fe_kNi_lSiO_4$, $Li_2Fe_kCo_lSiO_4$, $Li_2Fe_kMn_lSiO_4$, $Li_2Ni_kCo_lSiO_4$, $Li_2Ni_kMn_lSiO_4$ (k+l≤1, 0<k<1, and 0<l<1), $Li_2Fe_mNi_nCo_qSiO_4$, $Li_2Fe_mNi_nMn_qSiO_4$, $Li_2Ni_mCo_nMn_qSiO_4$ (m+n+q≤1, 0<m<1, 0<n<1, and 0<q<1), and $Li_2Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions or alkaline-earth metal ions, the positive electrode active substance layer may contain, instead of lithium in the lithium compound and the lithium-containing composite salt, an alkali metal (e.g., sodium or potassium), or an alkaline-earth metal (e.g., calcium, strontium, barium, beryllium, or magnesium).

The positive electrode active substance layer may include, in addition to a positive electrode active substance, a conductive additive and a binder.

<Negative Electrode Current Collector>

The negative electrode current collector includes a highly conductive material which is not alloyed with a carrier ion such as lithium. For example, stainless steel, iron, copper, nickel, or titanium can be used. In addition, the negative electrode current collector can have a foil-like shape, a plate-like shape (sheet-like shape), a net-like shape, a punching-metal shape, an expanded-metal shape, or the like as appropriate. The negative electrode current collector preferably has a thickness of greater than or equal to 10 μm and less than or equal to 30 μm.

<Negative Electrode Active Substance>

There is no particular limitation on the negative electrode active substance as long as the material can occlude and release carrier ions. For example, a lithium metal, a carbon-based material, silicon, a silicon alloy, or tin can be used. As a carbon-based material which can occlude and release lithium ions, an amorphous or crystalline carbon material such as a graphite powder or a graphite fiber can be used.

The negative electrode active substance layer may include, in addition to a negative electrode active substance, a conductive additive and a binder.

The power storage device described in this embodiment has a structure in which the negative electrode is surrounded by the separator, and may have any other structure as long as the separator is not in contact with the current collector.

The above structure makes a reaction product less likely to occur in the power storage device including the ionic liquid and the separator.

In this embodiment, one embodiment of the present invention has been described. Other embodiments of the present invention are described in the other embodiments. Note that one embodiment of the present invention is not limited thereto. That is, various embodiments of the invention are described in this embodiment and the other embodiments, and thus one embodiment of the present invention is not limited to a specific embodiment. Although an example of application to a lithium-ion secondary battery is described as one embodiment of the present invention, one embodiment of the present invention is not limited to this example. Depending on circumstances or conditions, one embodiment of the present invention can be used for a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor, and a lithium ion capacitor. Furthermore, depending on circumstances or conditions, for example, one embodiment of the present invention is not necessarily used for a lithium-ion secondary battery. For example, although an example of using the ionic liquid has been described as one embodiment of the present invention, one embodiment of the present invention is not limited to this example. Depending on circumstances or conditions, in one embodiment of the present invention, a variety of materials may be used. Furthermore, for example, depending on circumstances or conditions, the ionic liquid is not necessarily used in one embodiment of the present invention.

Embodiment 2

In this embodiment, an arrangement of positive and negative electrodes different from that shown in the above embodiment will be described with reference to FIG. 2. Specifically, the negative electrode is provided on the outer side.

In the perspective view of FIG. 2, a plurality of negative electrodes, a plurality of positive electrodes, and the like are illustrated as electrodes. The negative electrode 101 is provided on the outer side, and the separator 113 is provided so as to surround the positive electrode 102. The negative electrodes face and overlap with the positive electrodes.

The negative electrode 101 includes a negative electrode current collector 111 *a*, and a negative electrode active substance 122 *a* is provided on a surface of the negative electrode current collector 111 *a*. The negative electrode 101 including the negative electrode active substance 122 *a* on one surface is provided on the outer side of the layered structure in FIG. 2. Hence, the surface of the negative electrode current collector 111 *a* is exposed. A negative electrode 104 includes a negative electrode current collector 111 *b*, and a negative electrode active substance 122 *b* is provided on both surfaces of the negative electrode current collector 111 *b*. The other negative electrodes on the inner side of the layered structure have the same structure.

In contrast to the above embodiment, the separator 113 is provided so as to surround the positive electrode 102. The separator 113 is preferably arranged so as not to touch the surface of the negative electrode current collector 111*a*. The active substance is provided on both surfaces of the electrode surrounded by the separator 113. The separator 113 in this embodiment is also preferable because it is not in contact with any surface of the current collectors.

Although not illustrated in FIG. 2, a protective film may be formed on the surface of the negative electrode current collector 111*a* which is exposed on the outer side. The protective film can be made of a material that is less impregnated with an ionic liquid than cellulose is, e.g., polypropylene, polyethylene, polybutene, nylon, polyester, polysulfone, polyacrylonitrile, polyvinylidene fluoride, or tetrafluoroethylene.

The other structures are the same as those in the above embodiment. The positive and negative electrodes are stored in an exterior body. The exterior body is filled with an ionic liquid. The separator 113 is impregnated with the ionic liquid in some cases.

In this embodiment, the number of positive and negative electrodes which are layered can be determined by the battery capacity.

Also in the structure of FIG. 2, the separator 113 is not in contact with the surface of the current collector. Such a structure makes a reaction product less likely to occur in the power storage device including the ionic liquid and the separator.

The structures disclosed in the above embodiment can be used as appropriate as the structures that are not shown in this embodiment.

Embodiment 3

In this embodiment, a separator with a shape different from that described in the above embodiments and the like will be described with reference to FIGS. 3A to 3C. In this embodiment, the separator has an opening.

Figure 3A:
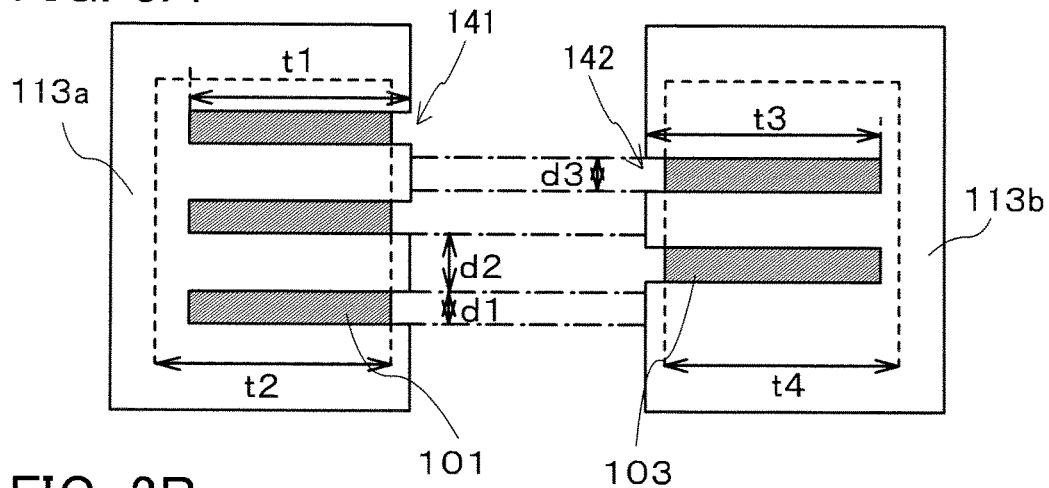
FIGS. 3A to 3C illustrate structures of a separator of one embodiment.

As illustrated in the top view of FIG. 3A, a first separator 113*a* includes a first opening 141 and a second separator 113*b* includes a second opening 142. The negative electrode 101 is exposed in the first opening 141 and the positive electrode 103 is exposed in the second opening 142.

The separator including the opening might cause a short-circuit between the positive electrode and the negative electrode. However, the short-circuit can be prevented when the first separator 113*a* surrounds the negative electrode, the second separator 113*b* surrounds the positive electrode, and the first opening 141 is arranged so as not to overlap with the second opening 142 as illustrated in FIG. 3A.

The first separator 113*a* and the second separator 113*b* may have a tubular shape, a bag-like shape, or a sheet-like shape.

The first separator 113*a* and the second separator 113*b* can be impregnated with an ionic liquid. Then, the separator expands in a planar direction, reducing the area of the first opening 141 or the second opening 142 in some cases.

In the illustrated example, three first openings 141 and two second openings 142 are provided. The number of first openings 141 may be equal to that of second openings 142.

A length (t1) of the first opening 141 is determined by a width (t2) of the negative electrode 101. An end portion of the negative electrode 101 is not exposed in the first opening 141 when t1<t2 is satisfied. The end portion of the negative electrode 101 is apart from the first separator 113 *a* when t1>t2 is satisfied.

A length (t3) of the second opening 142 is determined by a width (t4) of the positive electrode 103. An end portion of the positive electrode 103 is not exposed in the second opening 142 when t3<t4 is satisfied. The end portion of the positive electrode 103 is apart from the second separator 113 *b* when t3>t4 is satisfied.

A width (d1) of the first opening 141 is determined by a width (d2) of a region between the first openings, where the first opening is not provided. A width (d3) of the second opening 142 is determined by the width (d2) of the region between the first openings, where the first opening is not provided. When d2>d1 and d2>d3 are satisfied, the negative electrode 101 exposed in the first opening 141 is not in contact with the positive electrode 103 exposed in the second opening 142.

In the case where a plurality of first openings 141 are provided in the first separator 113*a*, they can have the same shape or different shapes. In the case where a plurality of second openings 142 are provided in the second separator 113*b*, they can have the same shape or different shapes.

The first opening 141 and the second opening 142 may have different shapes. For example, the first opening 141 may have a circular shape and the second opening 142 may have a rectangular shape. The first opening 141 and the second opening 142 may have different sizes. The width of the first opening 141 may be smaller than that of the second opening 142. For example, a slit-like opening 143 may be employed as illustrated in FIG. 3B, in which case the area of the positive and negative electrodes exposed in the opening 143 can be reduced.

A short-circuit between the positive electrode and the negative electrode can be prevented by making the first opening 141 and the second opening 142 have different shapes and the like.

Figure 3B:
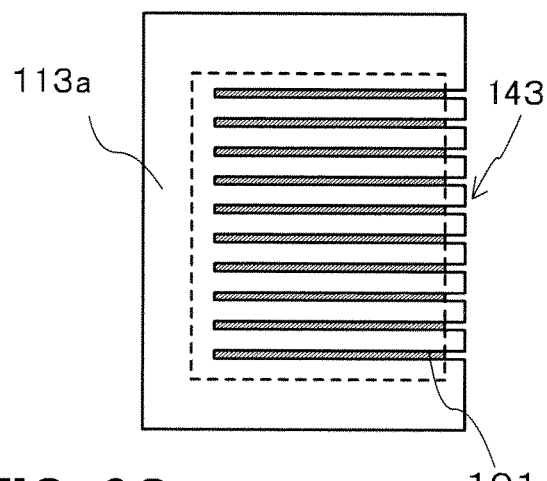

In the first separator 113 *a* having a slit-like opening illustrated in FIG. 3B, a large number of openings 143 are preferably provided. Since the negative electrode 101 is exposed in the slit-like opening 143, the separator on the positive electrode side is arranged so as to prevent a short-circuit. The second opening 142 may have a slit-like shape.

Figure 3C:
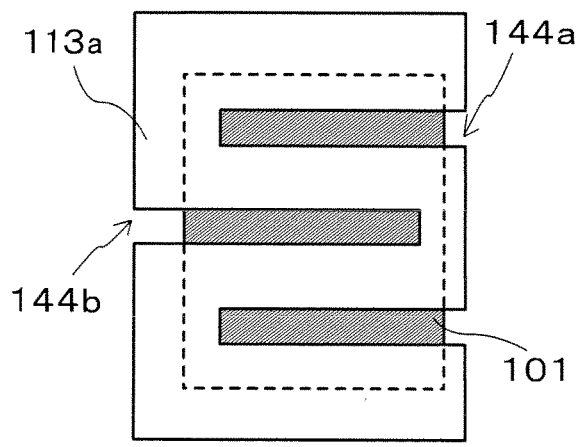

FIG. 3C illustrates a third opening 144*a* and a fourth opening 144*b*. A cut portion of the third opening 144*a* can be made in a side different from that of a cut portion of the fourth opening 144*b*.

The aforementioned separator including openings is preferably used when a power storage device is bent, in which case the separator is not wrinkled even in bending. In addition, the positive or negative electrode does not protrude from the opening even in bending, preventing a short-circuit therebetween.

The structures disclosed in the above embodiments can be used as appropriate as the structures that are not shown in this embodiment.

Embodiment 4

The power storage devices shown in the above embodiments can be bent. In this embodiment, bending of a power storage device will be described with reference to FIG. 4.

Figure 4:
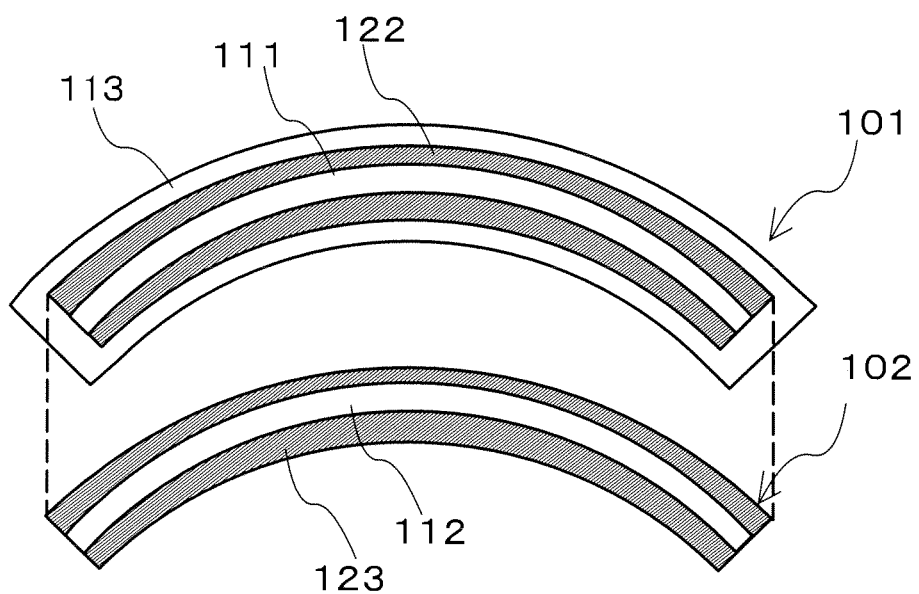
FIG. 4 illustrates a structure of a power storage device of one embodiment.

FIG. 4 illustrates the negative electrode 101 and the positive electrode 102 which are bent. For easy understanding, the negative electrode 101 and the positive electrode 102 are apart from each other; they are close to each other in fact. That is, the negative electrode 101 is in contact with the positive electrode 102 with the separator 113 surrounding the negative electrode 101 provided therebetween.

Although the single negative electrode 101 and the single positive electrode 102 are illustrated in FIG. 4, a plurality of positive electrodes and a plurality of negative electrodes may be layered as in the above embodiments.

The negative electrode 101 includes the negative electrode current collector 111 and the negative electrode active substance 122. The negative electrode active substance 122 is provided on both sides of the negative electrode current collector 111. In the case where the negative electrode is on the outer side of the layered structure, the active substance is provided on one side of the negative electrode current collector 111.

The positive electrode 102 includes the positive electrode current collector 112 and the positive electrode active substance 123. The positive electrode active substance 123 is provided on both sides of the positive electrode current collector 112. In the case where the positive electrode is on the outer side of the layered structure, the active substance is provided on one side of the positive electrode current collector 112.

The power storage device can be bent in the above manner. In the case where the power storage device includes an ionic liquid, the separator is impregnated with the ionic liquid, which case is preferable because the power storage device is unlikely to be wrinkled in bending. Even when the power storage device is bent, the separator is not in contact with a surface of a current collector, which case is preferable because a side reaction is unlikely to occur.

The structures disclosed in the above embodiments can be used as appropriate as the structures that are not shown in this embodiment.

Embodiment 5

In this embodiment, a structure of a power storage device that is bent and provided with a separator including an opening will be described with reference to FIGS. 5A and 5B and FIG. 6.

In order that the power storage device is bent easily, the separator preferably includes an opening as described in the above embodiments and the like.

Figure 5A:
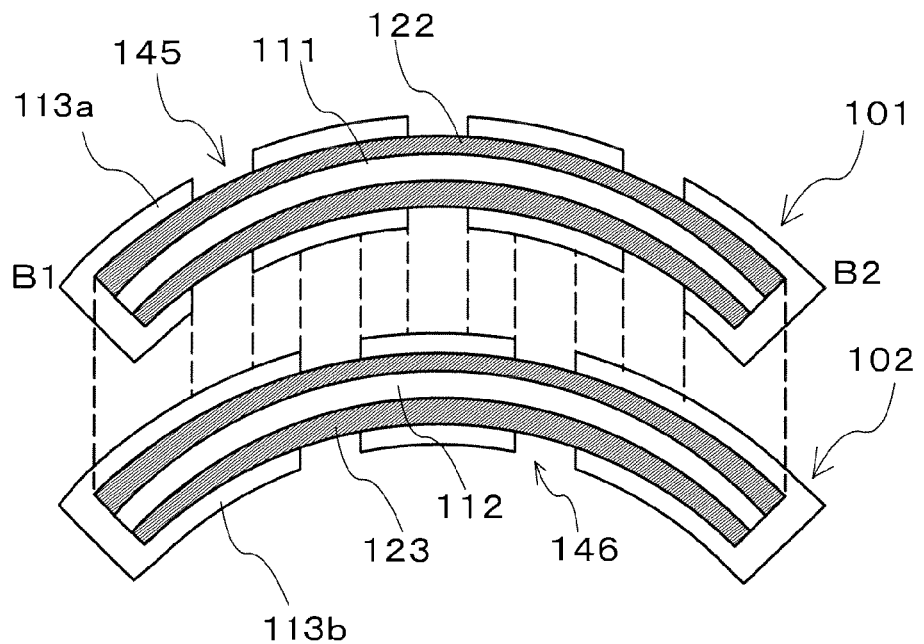
FIGS. 5A and 5B illustrate structures of a power storage device of one embodiment.

FIG. 5A is a cross-sectional view of the power storage device that is bent. The first separator 113 *a* surrounding the negative electrode 101 includes a first opening 145. The first opening 145 is provided on both surfaces of the first separator 113 *a*. The negative electrode 101 includes the negative electrode current collector 111 and the negative electrode active substance 122. The negative electrode active substance 122 is provided on both surfaces of the negative electrode current collector 111.

The second separator 113 *b* surrounding the positive electrode 102 includes a second opening 146. The second opening 146 is provided on both surfaces of the second separator 113 *b*. The positive electrode 102 includes the positive electrode current collector 112 and the positive electrode active substance 123. The positive electrode active substance 123 is provided on both surfaces of the positive electrode current collector 112.

The first opening 145 is provided so as not to overlap with the second opening 146, otherwise the positive electrode and the negative electrode are short-circuited.

The separators 113a and 113b are each impregnated with an ionic liquid, whereby the power storage device is unlikely to be wrinkled in bending.

The electrodes have a layered structure and therefore have different radii of curvature. An electrode on an inner side which has a smaller curvature radius preferably has a smaller number of openings in a separator than an electrode on an outer side which has a larger curvature radius. That is, when the power storage device including layered electrodes is bent, the number of openings in the separator is preferably gradually reduced from the outermost electrode toward the inner electrode. A large number of openings in a separator of an inner electrode having a smaller curvature radius might cause peeling between the separator and the electrode surrounded by the separator.

Figure 5B:
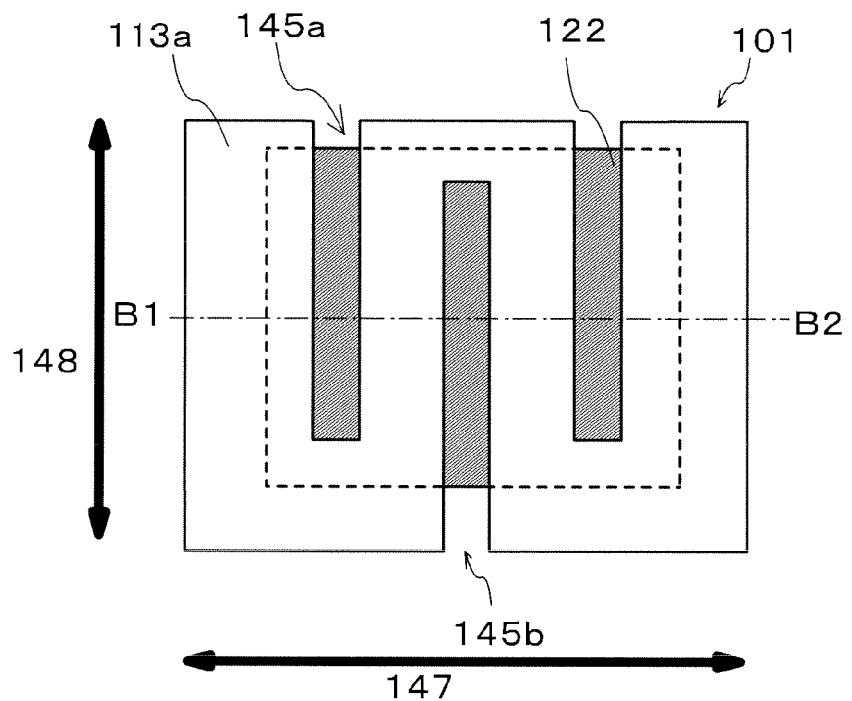

FIG. 5B is a top view of the negative electrode 101. FIG. 5A is a cross-sectional view of the negative electrode 101 taken along line B1-B2 in FIG. 5B. The power storage device is bent in a bending direction 147. The first opening 145 includes a first opening 145 a and a second opening 145 b. The negative electrode active substance 122 is exposed in the first opening 145 a and the second opening 145 b. A cut portion of the first opening 145 a is in a position different from that of a cut portion of the second opening 145 b. The cut portions of the first opening 145 a and the second opening 145 b are on opposite sides. This example of the separator corresponds to the structure in FIG. 3C shown in the above embodiments.

The opening in the separator may have any of the structures shown in the above embodiments. The power storage device can be easily bent when a cut portion is made on a side parallel to the bending direction 147.

The power storage device can be easily bent when a plurality of cut portions are provided on sides that are parallel to the bending direction 147 and that face each other as in the structure of FIG. 3C.

A longitudinal direction 148 of an opening is preferably arranged so as to cross the bending direction 147, in which case the power storage device can be easily bent.

As illustrated in FIG. 6, a longitudinal direction 152 of an opening 149 may be arranged so as to be parallel to the bending direction 147.

The second separator 113 b surrounding the positive electrode 102 can also include an opening in the above manner.

With any structure, the power storage device can be bent more easily than that with a structure in which a separator includes no opening.

The structures disclosed in the above embodiments can be used as appropriate as the structures that are not shown in this embodiment.

Embodiment 6

In this embodiment, another structure of a power storage device that is bent and provided with a separator including an opening will be described with reference to FIGS. 7A and 7B.

Figure 7A:
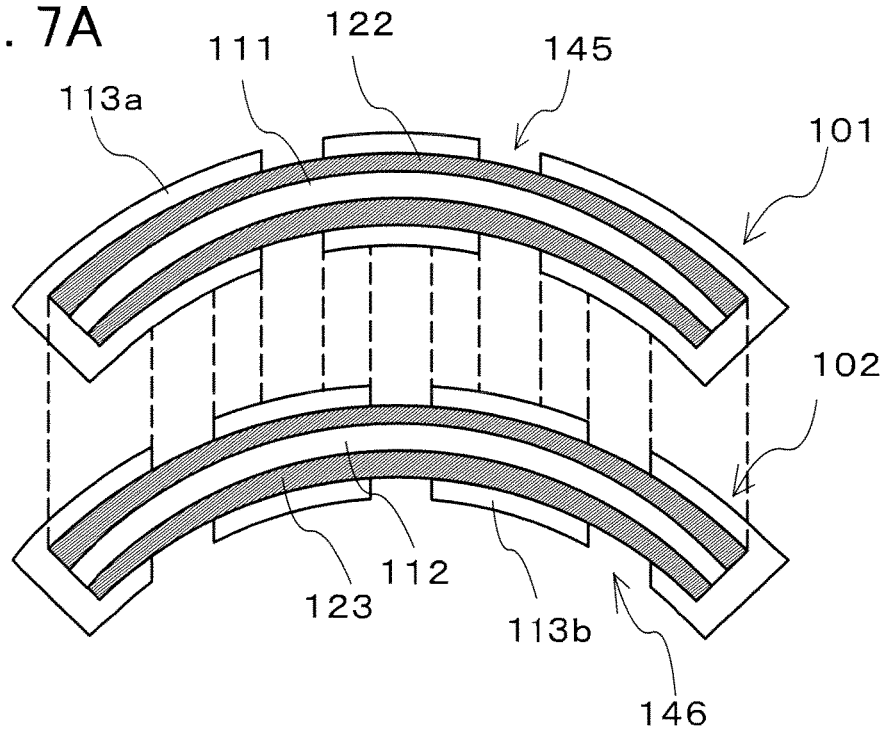
FIGS. 7A and 7B illustrate structures of a power storage device of one embodiment.
Figure 7B:
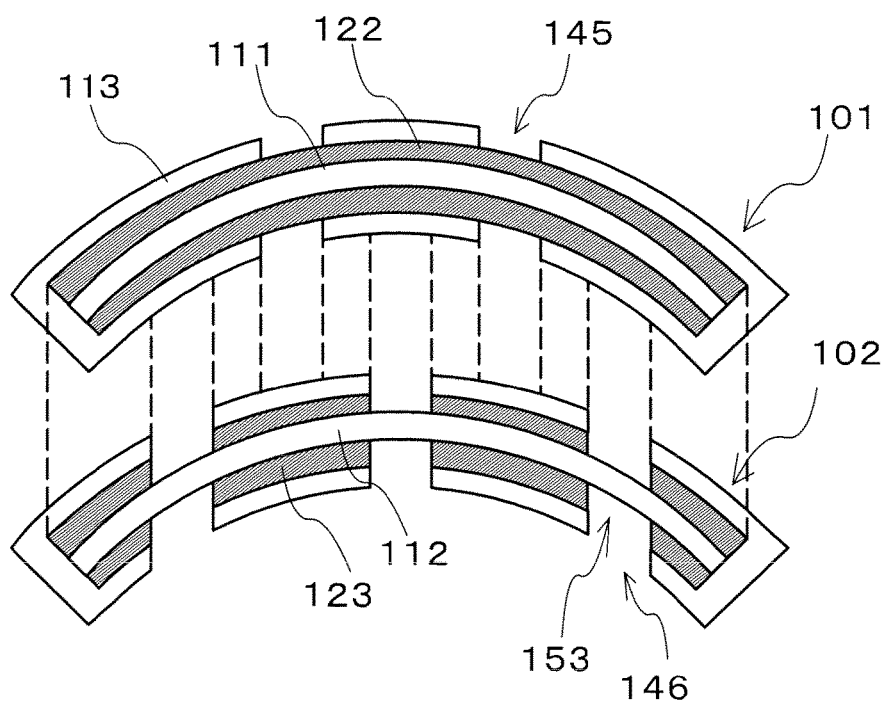

As illustrated in FIG. 7A, the first separator 113 a surrounding the negative electrode 101 includes the first opening 145. The negative electrode 101 includes the negative electrode current collector 111 and the negative electrode active substance 122 provided on both surfaces of the negative electrode current collector 111. The second separator 113 b surrounding the positive electrode 102 includes the second opening 146. The positive electrode 102 includes the positive electrode current collector 112 and the positive electrode active substance 123 provided on both surfaces of the positive electrode current collector 112.

The number of second openings 146 is larger than that of the first openings 145. When the electrode on an inner side which has a smaller curvature radius includes a larger number of openings in a separator, the power storage device can be easily bent.

When the power storage device with the above structure is bent, peeling between the active substance and the separator occurs in some cases. A cause of this is a difference in elasticity between the active substance and the separator. Thus, as illustrated in FIG. 7B, an opening 153 may be provided in the positive electrode active substance 123 of the positive electrode 102 on the inner side in addition to the second opening 146.

With any structure, the power storage device can be bent more easily than that with a structure in which a separator includes no opening.

The structures disclosed in the above embodiments can be used as appropriate as the structures that are not shown in this embodiment.

Embodiment 7

The power storage device of one embodiment of the present invention can be used as power sources of a variety of electric appliances which operate with power.

Specific examples of the electric appliances utilizing the power storage device of one embodiment of the present invention are as follows: display devices, lighting devices, desktop personal computers and laptop personal computers, image reproduction devices which reproduce still images and moving images stored in recording media such as Blu-ray Discs (registered trademark), mobile phones, smartphones, portable information terminals, portable game machines, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and dialyzers. In addition, moving objects driven by electric motors using power from power storage devices are also included in the category of electric appliances. Examples of the moving objects include electric vehicles, hybrid vehicles each including both an internal-combustion engine and an electric motor, and motorized bicycles including motor-assisted bicycles.

In the electric appliances, the power storage device of one embodiment of the present invention can be used as a power storage device for supplying enough power for almost the whole power consumption (referred to as a main power supply). Alternatively, in the electric appliances, the power storage device of one embodiment of the present invention can be used as a power storage device which can supply power to the electric appliances when the supply of power from the main power supply or a commercial power supply is stopped (such a power storage device is referred to as an uninterruptible power supply). Still alternatively, in the electric appliances, the power storage device of one embodiment of the present invention can be used as a power storage device for supplying power to the electric appliances at the same time as the power supply from the main power supply or a commercial power supply (such a power storage device is referred to as an auxiliary power supply).

Figure 9:
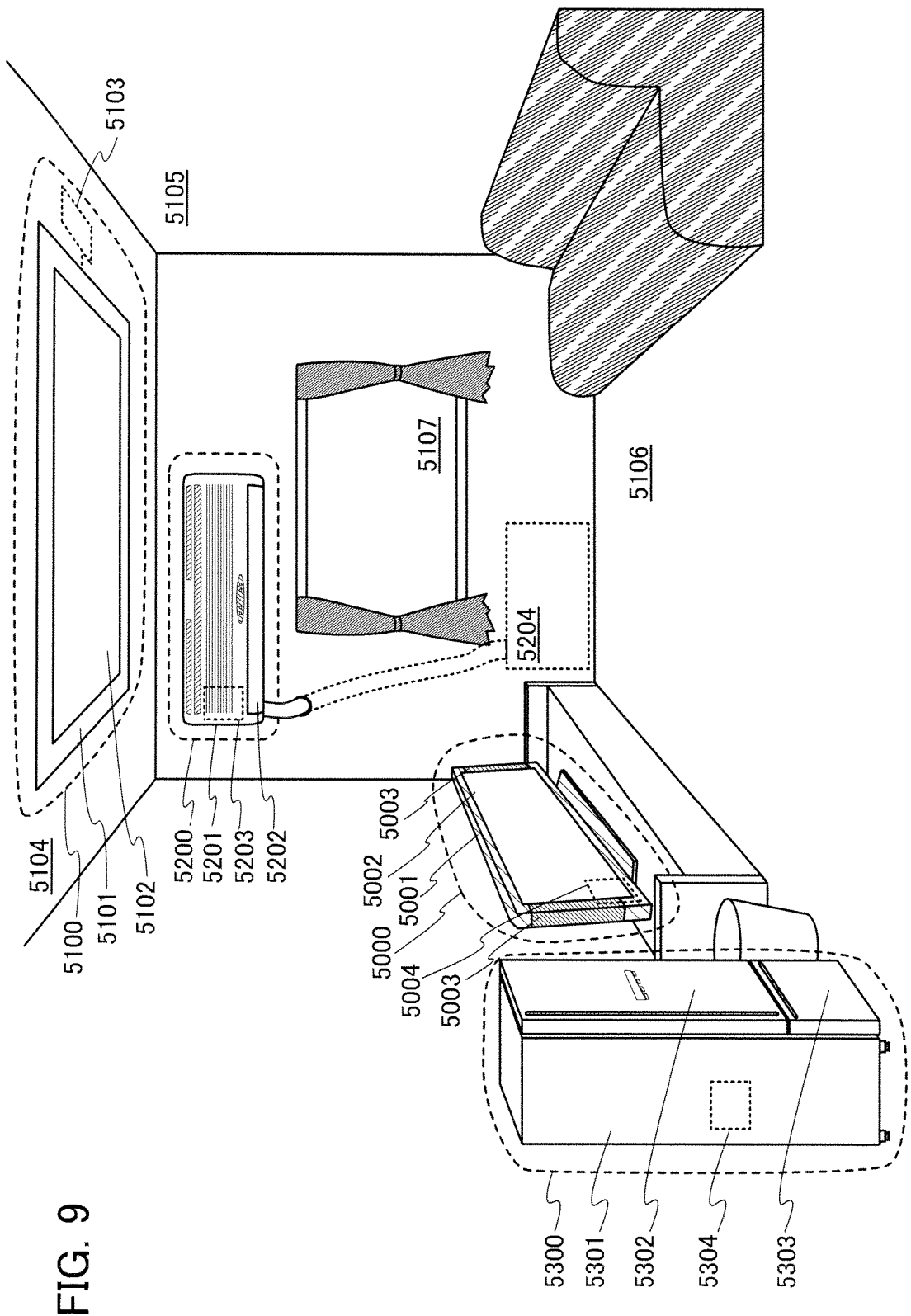
FIG. 9 illustrates electric appliances.

FIG. 9 illustrates specific structures of the electric appliances. In FIG. 9, a display device 5000 is an example of an electric appliance including a power storage device 5004. Specifically, the display device 5000 corresponds to a display device for TV broadcast reception and includes a housing 5001, a display portion 5002, speaker portions 5003, the power storage device 5004, and the like. The power storage device 5004 is provided in the housing 5001. The display device 5000 can receive electric power from a commercial power supply. Alternatively, the display device 5000 can use electric power stored in the power storage device 5004. Thus, the display device 5000 can be operated with the use of the power storage device 5004 as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 9, an installation lighting device 5100 is an example of an electric appliance including a power storage device 5103. Specifically, the lighting device 5100 includes a housing 5101, a light source 5102, a power storage device 5103, and the like. Although FIG. 9 illustrates the case where the power storage device 5103 is provided in a ceiling 5104 on which the housing 5101 and the light source 5102 are installed, the power storage device 5103 may be provided in the housing 5101. The lighting device 5100 can receive electric power from a commercial power supply. Alternatively, the lighting device 5100 can use electric power stored in the power storage device 5103. Thus, the lighting device 5100 can be operated with the use of the power storage device 5103 as an uninterruptible power supply even when electric power cannot be supplied from a commercial power supply due to power failure or the like.

Note that although the installation lighting device 5100 provided in the ceiling 5104 is illustrated in FIG. 9 as an example, the power storage device of one embodiment of the present invention can be used in an installation lighting device provided in, for example, a wall 5105, a floor 5106, a window 5107, or the like other than the ceiling 5104. Alternatively, the power storage device can be used in a tabletop lighting device or the like.

As the light source 5102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 9, an air conditioner including an indoor unit 5200 and an outdoor unit 5204 is an example of an electric appliance including a power storage device 5203. Specifically, the indoor unit 5200 includes a housing 5201, an air outlet 5202, a power storage device 5203, and the like. Although FIG. 9 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive electric power from a commercial power supply. Alternatively, the air conditioner can use electric power stored in the power storage device 5203. Particularly in the case where the power storage devices 5203 are provided in both the indoor unit 5200 and the outdoor unit 5204, the air conditioner can be operated with the use of the power storage device 5203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 9 as an example, the power storage device of one embodiment of the present invention can be used in an air conditioner in which the functions of an indoor unit and an outdoor unit are integrated in one housing.

In FIG. 9, an electric refrigerator-freezer 5300 is an example of an electric appliance including a power storage device 5304. Specifically, the electric refrigerator-freezer 5300 includes a housing 5301, a door for a refrigerator 5302, a door for a freezer 5303, the power storage device 5304, and the like. The power storage device 5304 is provided in the housing 5301 in FIG. 9. The electric refrigerator-freezer 5300 can receive electric power from a commercial power supply. Alternatively, the electric refrigerator-freezer 5300 can use electric power stored in the power storage device 5304. Thus, the electric refrigerator-freezer 5300 can be operated with the use of the power storage device 5304 as an uninterruptible power supply even when electric power cannot be supplied from a commercial power supply due to power failure or the like.

Note that among the electric appliances described above, a high-frequency heating apparatus such as a microwave oven and an electric appliance such as an electric rice cooker require high power in a short time. The excess of electric power over a prescribed electric amount of a commercial power supply can be prevented in use of an electric appliance by using the power storage device of one embodiment of the present invention as an auxiliary power supply for supplying electric power which cannot be supplied enough by the commercial power supply.

In addition, in a time period when electric appliances are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electric appliances are used. For example, in the case of the electric refrigerator-freezer 5300, electric power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of electric power in daytime can be reduced.

This embodiment can be implemented in appropriate combination with any of the structures described in the other embodiments.

Embodiment 8

Next, a portable information terminal which is an example of electric appliances provided with the power storage device of one embodiment of the present invention will be described.

Figure 10A:
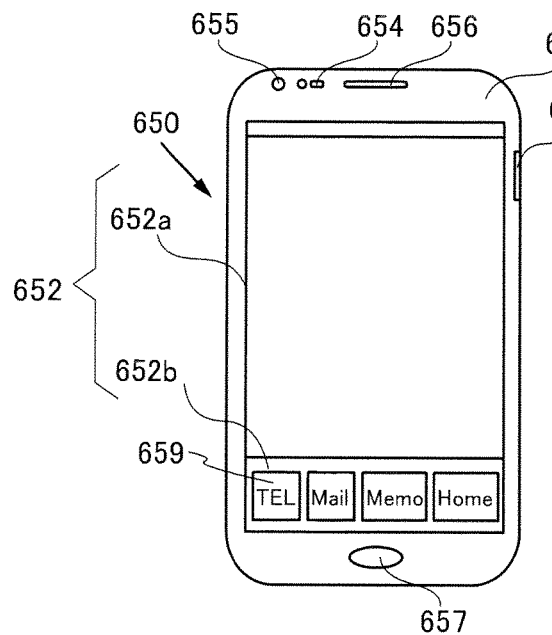
FIGS. 10A to 10C illustrate an electric appliance.
Figure 10B:
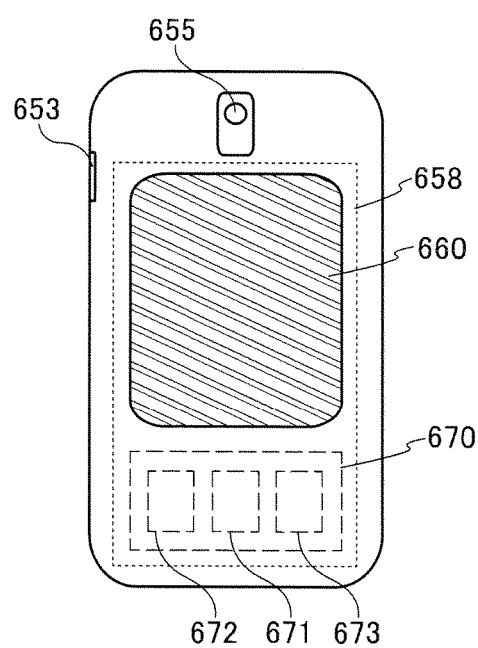

FIG. 10A is a schematic diagram of the front side of a portable information terminal 650. FIG. 10B is a schematic diagram of the back side of the portable information terminal 650. The portable information terminal 650 includes a housing 651, display portions 652 (including a display portion 652a and a display portion 652b), a power button 653, an optical sensor 654, a camera lens 655, a speaker 656, a microphone 657, and a power source 658.

The display portion 652a and the display portion 652b are touch panels. In the display portion 652a and the display portion 652b, keyboard buttons for inputting text can be displayed as needed. When the keyboard button is touched with a finger, a stylus, or the like, text can be input. Alternatively, when text is directly written or an illustration is directly drawn in the display portion 652a with a finger, a stylus, or the like without displaying the keyboard buttons, the text or the illustration can be displayed.

In the display portion 652b, functions which can be performed by the portable information terminal 650 are displayed. When a marker indicating a desired function is touched with a finger, a stylus, or the like, the portable information terminal 650 performs the function. For example, when a marker 659 is touched, the portable information terminal 650 can function as a phone; thus, phone conversation with the speaker 656 and the microphone 657 is possible.

The portable information terminal 650 incorporates a sensing device for determining inclination, such as a gyroscope or an acceleration sensor (not illustrated). Thus, when the housing 651 is placed horizontally or vertically, switching between display directions, for example, switching between a landscape mode and a portrait mode can be performed in the display portion 652a and the display portion 652b.

Further, the portable information terminal 650 is provided with the optical sensor 654; thus, in the portable information terminal 650, the brightness of the display portion 652a and the display portion 652b can be optimally controlled in accordance with the amount of ambient light sensed with the optical sensor 654.

Figure 10C:
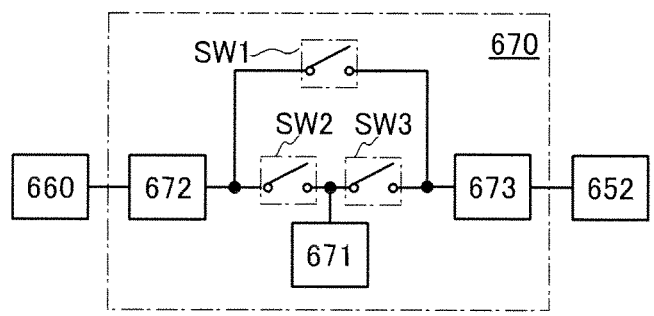

The portable information terminal 650 is provided with the power source 658 including a solar cell 660 and a charge/discharge control circuit 670. FIG. 10C illustrates an example where the charge/discharge control circuit 670 includes a battery 671, a DC-DC converter 672, and a converter 673. The power storage device described in the above embodiment is used as the battery 671.

The portable information terminal 650 can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached to the portable information terminal 650, can supply electric power to a display portion, an image signal processor, and the like. Note that the solar cell 660 can be provided on one or both surfaces of the housing 651 and thus the battery 671 can be charged efficiently. The use of the power storage device of one embodiment of the present invention as the battery 671 has advantages such as a reduction in size.

The structure and operation of the charge/discharge control circuit 670 illustrated in FIG. 10B will be described with reference to a block diagram of FIG. 10C. FIG. 10C illustrates the solar cell 660, the battery 671, the DC-DC converter 672, a converter 673, switches SW1 to SW3, and the display portion 652. The battery 671, the DC-DC converter 672, the converter 673, and the switches SW1 to SW3 correspond to the charge and discharge control circuit 670 in FIG. 10B.

First, an example of operation in the case where electric power is generated by the solar cell 660 using external light will be described. The voltage of electric power generated by the solar cell 660 is raised or lowered by the DC-DC converter 672 so as to be a voltage for charging the battery 671. When the display portion 652 is operated with the electric power from the solar cell 660, the switch SW1 is turned on and the voltage of the electric power is raised or lowered by the converter 673 to a voltage needed for operating the display portion 652. In addition, when display on the display portion 652 is not performed, the switch SW1 is turned off and the switch SW2 is turned on so that the battery 671 may be charged.

Although the solar cell 660 is described as an example of a power generation means, there is no particular limitation on the power generation means, and the battery 671 may be charged with any of the other means such as a piezoelectric element or a thermoelectric conversion element (Peltier element). For example, the battery 671 may be charged with a non-contact power transmission module capable of performing charging by transmitting and receiving electric power wirelessly (without contact), or any of the other charge means used in combination.

It is needless to say that one embodiment of the present invention is not limited to the portable information terminal illustrated in FIGS. 10A to 10C as long as the power storage device described in any of the above embodiments is included. Note that this embodiment can be implemented in appropriate combination with any of the structures described in the other embodiments.

Embodiment 9

Furthermore, an example of the moving object which is an example of the electric appliance is described with reference to FIG. 11.

Any of the power storage devices described in the above embodiments can be used as a control battery. The control battery can be charged by electric power supply from the outside using a plug-in technique or contactless power feeding. Note that in the case where the moving object is an electric railway vehicle, the electric railway vehicle can be charged by electric power supply from an overhead cable or a conductor rail.

FIG. 11 illustrates an example of an electric vehicle. An electric vehicle 680 is equipped with a battery 681. The output of the power of the battery 681 is adjusted by a control circuit 682 and the power is supplied to a driving device 683. The control circuit 682 is controlled by a processing unit 684 including a ROM, a RAM, a CPU, or the like which is not illustrated.

The driving device 683 includes a DC motor or an AC motor either alone or in combination with an internal-combustion engine. The processing unit 684 outputs a control signal to the control circuit 682 based on input data such as data on operation (e.g., acceleration, deceleration, or stop) by a driver of the electric vehicle 680 or data on driving of the electric vehicle 680 (e.g., data on an uphill or a downhill, or data on a load on a driving wheel). The control circuit 682 adjusts the electric energy supplied from the battery 681 in accordance with the control signal of the processing unit 684 to control the output of the driving device 683. In the case where the AC motor is mounted, although not illustrated, an inverter which converts direct current into alternate current is also incorporated.

The battery 681 can be charged by electric power supply from the outside using a plug-in technique. For example, the battery 681 is charged through a power plug from a commercial power source. The battery 681 can be charged by converting external power into DC constant voltage having a predetermined voltage level through a converter such as an AC-DC converter. When the power storage device of one embodiment of the present invention is provided as the battery 681, capacity of the battery 681 can be increased and improved convenience can be realized. When the battery 681 itself can be made compact and lightweight with improved characteristics of the battery 681, the vehicle can be made lightweight, leading to an increase in fuel efficiency.

Note that it is needless to say that one embodiment of the present invention is not limited to the electric vehicle illustrated in FIG. 11 as long as the power storage device described in any of the above embodiments is included. Note that this embodiment can be implemented in appropriate combination with any of the structures described in the other embodiments.

Example 1

Figure 8:
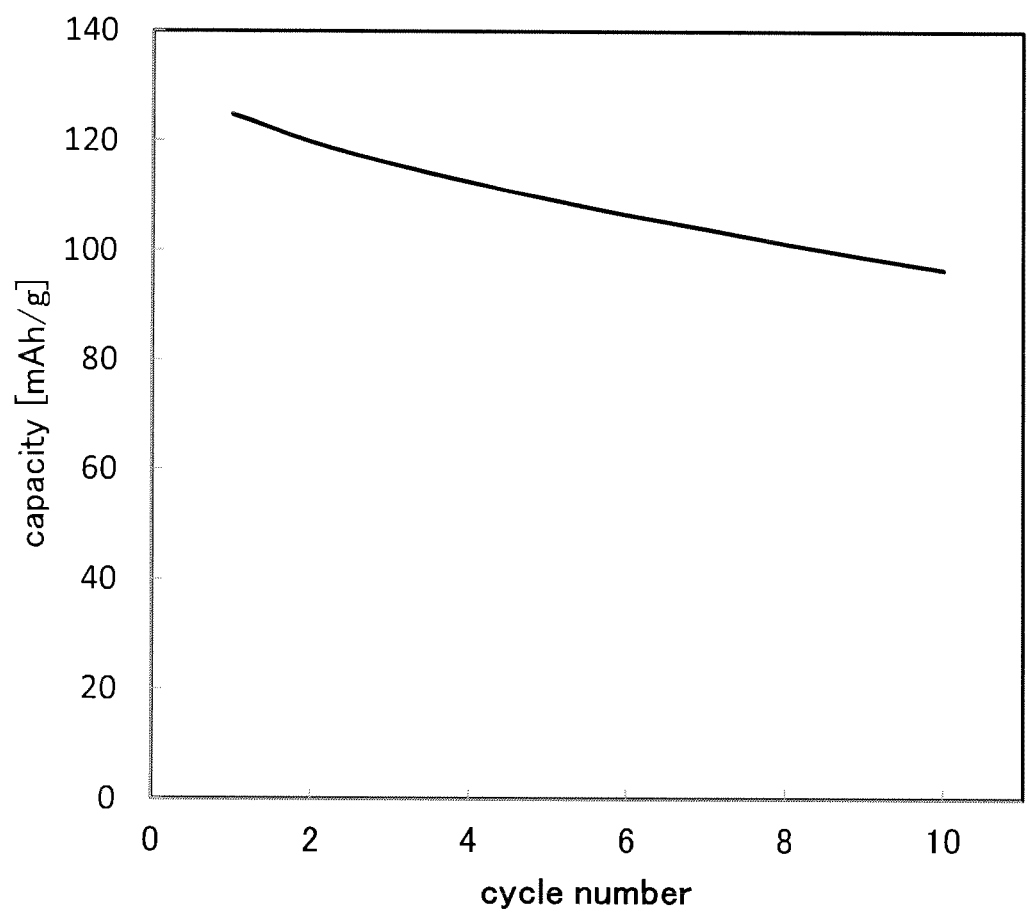
FIG. 8 is a graph showing the cycle performance of a power storage device of one embodiment.

The cycle performance of the power storage device with the structure illustrated in FIGS. 1A and 1B of Embodiment 1 was measured and shown in FIG. 8.

As compared with the cycle performance of a secondary battery producing a reaction product, the cycle performance in FIG. 8 exhibited a gradual decrease in capacity.

This application is based on Japanese Patent Application serial No. 2014-216849 filed with Japan Patent Office on Oct. 24, 2014, the entire contents of which are hereby incorporated by reference.

What is claimed is:

1. A power storage device comprising:
a negative electrode;
a positive electrode;
a separator; and
an ionic liquid,
wherein the positive electrode comprises a first current collector and a first active substance provided on a surface of the first current collector,
wherein the negative electrode comprises a second current collector and second active substances provided on both surfaces of the second current collector,
wherein the separator is not in contact with the surface of the first current collector,
wherein the separator surrounds the negative electrode,
wherein the separator is in contact with the ionic liquid,
wherein the separator includes at least one slit-like opening between the negative electrode and the positive electrode,
wherein the slit-like opening is overlapped with the surface of the first current collector and the both surfaces of the second current collector,
wherein the power storage device can be bent in a direction, and
wherein a longitudinal direction of the slit-like opening crosses the direction.

2. The power storage device according to claim 1,
wherein the separator has a tubular shape.

3. The power storage device according to claim 1,
wherein the separator is impregnated with the ionic liquid.

4. The power storage device according to claim 1,
wherein the separator includes cellulose.

5. The power storage device according to claim 1,
wherein the separator has a hollow structure, and
wherein the negative electrode is in the hollow structure.

6. A power storage device comprising:
a negative electrode;
a positive electrode;
a separator; and
an ionic liquid,
wherein the negative electrode comprises a first current collector and a first active substance provided on a surface of the first current collector,
wherein the positive electrode comprises a second current collector and second active substances provided on both surfaces of the second current collector,
wherein the separator is not in contact with the surface of the first current collector,
wherein the separator surrounds the positive electrode,
wherein the separator is in contact with the ionic liquid,
wherein the separator includes at least one slit-like opening between the negative electrode and the positive electrode,
wherein the slit-like opening is overlapped with the surface of the first current collector and the both surfaces of the second current collector,
wherein the power storage device can be bent in a direction, and
wherein a longitudinal direction of the slit-like opening crosses the direction.

7. The power storage device according to claim 6,
wherein the separator has a tubular shape.

8. The power storage device according to claim 6,
wherein the separator is impregnated with the ionic liquid.

9. The power storage device according to claim 6,
wherein the separator includes cellulose.

10. The power storage device according to claim 6,
wherein the separator has a hollow structure, and
wherein the positive electrode is in the hollow structure.

11. A power storage device comprising:
a negative electrode;
a positive electrode;
a first separator;
a second separator; and
an ionic liquid,
wherein the negative electrode comprises a first current collector and first active substances provided on both surfaces of the first current collector,
wherein the positive electrode comprises a second current collector and second active substances provided on both surfaces of the second current collector,
wherein the first separator is not in contact with the both surfaces of the first current collector and the second separator is not in contact with the both surfaces of the second current collector,
wherein the first separator surrounds the negative electrode,
wherein the second separator surrounds the positive electrode,
wherein each of the first separator and the second separator is in contact with the ionic liquid, wherein the first separator includes at least one first opening between the negative electrode and the positive electrode, wherein the second separator includes at least one second opening between the negative electrode and the positive electrode, wherein the first opening and the second opening are overlapped with the both surfaces of the first current collector and the both surfaces of the second current collector, wherein the first opening and the second opening do not overlap with each other, wherein the power storage device can be bent in a direction, and wherein a longitudinal direction of each of the first opening and the second opening crosses the direction.

12. The power storage device according to claim 11, wherein each of the first separator and the second separator has a tubular shape.

13. The power storage device according to claim 11, wherein each of the first separator and the second separator is impregnated with the ionic liquid.

14. The power storage device according to claim 11, wherein each of the first separator and the second separator includes cellulose.

15. The power storage device according to claim 11, wherein the first separator has a hollow structure, and wherein the negative electrode is in the hollow structure.

16. The power storage device according to claim 11, wherein the second separator has a hollow structure, and wherein the positive electrode is in the hollow structure.

* * * * *